United States Patent
Das et al.

(10) Patent No.: US 8,515,500 B2
(45) Date of Patent: Aug. 20, 2013

(54) POWER CONSERVATION IN WIRELESS CLIENT TERMINALS AND SYSTEM LATENCY REDUCTION USING A PROXY DEVICE

(75) Inventors: Soumya Das, San Diego, CA (US);
Samir S. Soliman, San Diego, CA (US);
Nishith Chaubey, San Diego, CA (US);
Andrew T. Hunter, San Diego, CA (US); Paul B. McAllister, Jamul, CA (US)

(73) Assignee: QUALCOMM Incorporated, San Diego, CA (US)

( * ) Notice: Subject to any disclaimer, the term of this patent is extended or adjusted under 35 U.S.C. 154(b) by 208 days.

(21) Appl. No.: 12/883,467

(22) Filed: Sep. 16, 2010

(65) Prior Publication Data

US 2012/0072751 A1 Mar. 22, 2012

(51) Int. Cl.
*G06F 15/16* (2006.01)
(52) U.S. Cl.
USPC .......................................... 455/574; 455/518
(58) Field of Classification Search
USPC ................. 455/418, 434, 518, 574; 370/231, 370/335, 352
See application file for complete search history.

(56) References Cited

U.S. PATENT DOCUMENTS

| | | |
|---|---|---|
| 2005/0288048 A1 | 12/2005 | Rosen et al. |
| 2006/0087993 A1 | 4/2006 | Sengupta et al. |
| 2008/0071391 A1 * | 3/2008 | Busby et al. ................ 700/12 |
| 2008/0101340 A1 | 5/2008 | Bernath |
| 2009/0221303 A1 | 9/2009 | Soliman |
| 2012/0224582 A1 * | 9/2012 | Diab et al. ................ 370/395.1 |

FOREIGN PATENT DOCUMENTS

GB 2396525 B 5/2006

OTHER PUBLICATIONS

International Search Report and Written Opinion—PCT/US2011/051806—ISA/EPO—Jan. 30, 2012.

* cited by examiner

*Primary Examiner* — Sam Bhattacharya
(74) *Attorney, Agent, or Firm* — Jeffrey D. Jacobs

(57) ABSTRACT

A scheme is provided for conserving power in client terminals and/or reducing latency in wireless systems by using a proxy device. The client terminal may have a primary communication interface for communications with an access node and a secondary communication interface to communicate with the proxy device. The client terminal may indicate to the access node a short cycle rate for monitoring its signaling/control channel(s). The client terminal may the power off its primary communication interface without informing the access node. Prior to powering off its primary communication interface, the client terminal may assign the proxy device to act as its proxy and monitor the signaling/control channel with the access node. The proxy device monitors the signaling/control channel(s) according to the indicated short cycle rate. Upon detection of a message for the client terminal, the proxy device forwards the message to the client terminal via a secondary communication interface.

45 Claims, 11 Drawing Sheets

POWER CONSERVATION IN WIRELESS CLIENT TERMINALS AND SYSTEM LATENCY REDUCTION USING A PROXY DEVICE

BACKGROUND

1. Field

Various features disclosed herein pertain to wireless communication systems, and at least some features pertain to devices and methods for facilitating both power conservation in a wireless client terminal and latency reduction in a wireless communication system by using a proxy device to receive and forward messages to the client terminal via a secondary wireless interface.

2. Background

Client terminals, such as laptop computers, personal digital assistant devices, mobile or cellular phones, or any other device with a processor, that communicate with other devices through wireless signals are becoming increasingly popular. Client terminals typically utilize various channels for different modes of operation. With consumers using power-intensive applications that run on the client terminals and often require nearly continuous network access, conserving network resources such as bandwidth becomes increasingly important. At the same time, client terminals often have a limited power source (e.g., rechargeable battery pack) and, consequently, may operate in various modes that may assist in extending the operating life of a client terminal between recharging.

Client terminals may operate in one of several modes, including an "active" mode and an "idle" mode. In active mode, client terminals may actively exchange data (e.g., voice or data calls or sessions) with one or more access nodes (e.g., base stations, Node B, femto cell, etc.) in a wireless communication system. In idle mode, the client terminal may monitor control channels, such as the paging channel (PCH) for paging messages. Such paging messages may include messages that alert the client terminal to the occurrence of an incoming voice or data call and control/overhead messages that carry system information and other information for the client terminal.

Power consumption in idle mode is substantially less than in the active mode. However, the client terminal continues to consume power to sustain circuitry needed to monitor the paging channel(s). Conventionally, in order to reduce power consumption in the idle mode, paging messages may be sent on the paging channel to the client terminal at designated times. Instead of monitoring the paging channel continuously, the client terminal may conserve power by periodically monitoring the paging channel by operating in a discontinuous reception mode (e.g., DRX). In the discontinuous reception mode, the client terminal wakes up from a "sleep" state, enters an "awake" state and processes the paging channel for messages, and reverts back to the sleep state if additional communication is not required.

Because the client terminal may spend a significant amount of time with the communication circuitry powered down (e.g., partially or fully powered off) in the sleep state, substantial power savings may be attained. However, the responsiveness of the communication system can suffer because the sleep state imposes additional delay in establishing (or reestablishing) communications to the client terminal. The degradation of the system responsiveness increases as the duration of the sleep cycles increases. That is, in systems with long sleep cycles, power conservation is substantially enhanced, but the system responsiveness may not be acceptable for all applications. In systems with short sleep cycles, client terminals experience faster power depletion or consumption, but the system responsiveness is enhanced. Accordingly, system engineers are faced with a trade-off between poor power conservation and poor responsiveness.

Therefore, there is a need for a solution that reduces power consumption of a client terminal while also increasing responsiveness.

SUMMARY

Various implementations include systems, devices and methods for facilitating simultaneous power conservation and system responsiveness in a client terminal by telling the network that the client terminal will listen for incoming messages at a short cycle rate, and using a proxy device to listen for incoming messages for the client terminal while the client terminal switches from an idle mode to a proxy mode.

One feature includes client terminals for facilitating power conservation and improved system responsiveness. Such a client terminal may include a first communication interface for wirelessly communicating with an access node, and a second communication interface for wirelessly communicating with a proxy device. A processing circuit may be coupled to the first communication interface and to the second communication interface. The processing circuit may be adapted to send a message intended for a proxy device, the message including a request to operate as a proxy by monitoring a signaling/control channel for the client terminal and forwarding incoming messages from the signaling/control channel to the client terminal via the second communication interface. The processing circuit may further be adapted to send a message intended for an access node indicating monitoring of the signaling/control channel using the first communication interface at a short cycle rate. For instance, the message to the access node may indicate monitoring of the signaling/control channel continuously. The processing circuit may additionally be adapted to power down the first communication interface while the access node still believes that the client terminal is monitoring at the indicated short cycle rate with the first communication interface, and monitor the second communication interface for forwarded incoming messages. For instance, the second communication interface may be monitored at a cycle rate between about 50 milliseconds and 100 milliseconds.

The client terminal may subsequently receive a forwarded incoming message from the proxy device comprising a push-to-talk Announce Call message. The client terminal may also be adapted to send a push-to-talk call request message to the proxy device via the second communication interface when the first communication interface is powered down. This allows the client terminal to initiate the push-to-talk call before its first communication interface is powered back on.

Note that, for equivalent channel monitoring cycle rates, using the first communication interface may consume more power than the second communication interface. In one example, at least one of the first communication interface is a Code Division Multiple Access (CDMA)-compliant interface or the second communication interface is a Bluetooth-compliant interface.

According to one example, powering down the first communication interface may reduce the power consumption of the first communication interface but does not turn it fully off. For example, powering down the first communication interface may reduce the power consumption of the first communication interface by monitoring the signal/control channel at a long cycle rate, where the long cycle rate is longer than the short cycle rate. For instance, powering down the first communication interface may include turning off the first communication interface for an interval longer than the short cycle rate. In another example, powering down the first communication interface may turn off the first communication interface until a forwarded incoming message is received via the second communication interface.

Methods operational on a client terminal are provided according to one feature for facilitating simultaneous power conservation and system responsiveness in the client terminal. Such methods may include sending a message including a request for a proxy device to operate as a proxy by monitoring a signaling/control channel for the client terminal and forwarding incoming messages from the signaling/control channel to the client terminal via the second communication interface. A message may also be sent that includes an indication for an access node that the signaling/control channel is being monitored by a first communication interface at a short cycle rate. The first communication interface may be powered down while the access node still believes that the client terminal is monitoring with the first communication interface at the indicated short cycle rate. The access terminal may then monitor the second communication interface for forwarded incoming messages from the proxy device.

Another feature includes proxy devices for facilitating simultaneous power conservation and system responsiveness in client terminals. Such a proxy device may include a first communication interface for communicating with an access node, and a second communication interface for wirelessly communicating with a client terminal. For equivalent channel monitoring cycle rates, the first communication interface may consume more power than the second communication interface. A processing circuit may be coupled between the first communication interface and the second communication interface. In one example, at least one of the first communication interface is a Code Division Multiple Access (CDMA)-compliant interface and/or the second communication interface is any Bluetooth compliant interface.

The processing circuit may be adapted to receive a request from the client terminal to operate as a proxy for the client terminal while the client terminal powers down its own first communication interface, send an acknowledgement to the client terminal that it will operate as a proxy for the client terminal, and monitor for incoming messages on a signaling/control channel for the client terminal via the first communication interface at a cycle rate indicated by the client terminal, wherein the same cycle rate is also communicated to an access node to indicate that the signaling/control channel is being monitored by a first communication interface of the client terminal at the cycle rate, even though the first communication interface of the client terminal is powered down. In one example, the cycle rate indicated by the client terminal and also communicated to the access node may be continuous (e.g., continuous monitoring). Alternatively, the cycle rate indicated by the client terminal and also communicated to the access node is, for example, less than 5.12 seconds, 1.28 seconds, 800 millisecond, 500 milliseconds, 300 milliseconds, 200 milliseconds, or 100 milliseconds. The processing circuit may further be adapted to forward an incoming message received via the first communication interface to the client terminal via the second communication interface. The proxy device may also be configured to send a message to an access node on behalf of the client terminal in response to an incoming message received from the access node that is intended for the client terminal. According to one example, the request from the client terminal may includes a client identifier, one or more signaling/control channels associated with the client terminal, and/or the cycle rate associated with the one or more signaling/control channels.

According to one feature, the processing circuit of the proxy device may be further adapted to monitor for an incoming message comprising a push-to-talk Announce Call message on a signaling/control channel for the client terminal via the first communication interface at the cycle rate indicated by the client terminal and communicated to the access node. Upon receipt of such incoming message, the proxy device may forward the push-to-talk Announce Call message received via the first communication interface to the client terminal via the second communication interface.

According to another feature the processing circuit of the proxy device may receive a push-to-talk call request message from the client terminal via the second communication interface. The proxy device may then forward the push-to-talk call request message to an access node via the first communication interface.

Methods operational on a proxy device are provided according to one feature for facilitating simultaneous power conservation and system responsiveness in client terminals. A method may include receiving a request from a client terminal to operate as a proxy for the client terminal while the client terminal powers down its own first communication interface. A signaling/control channel may be monitored for incoming messages for the client terminal via a first communication interface of the proxy device at a cycle rate indicated by the client terminal, which cycle rate is also communicated to an access node to indicate that the signaling/control channel is being monitored by a first communication interface of the client terminal at that cycle rate, even though the first communication interface of the client terminal is powered down. An incoming message received via the first communication interface may be forwarded to the client terminal via a second communication interface.

BRIEF DESCRIPTION OF THE DRAWINGS

Several features, nature, and/or advantages may become more apparent from the detailed description set forth below when taken in conjunction with the drawings in which like reference characters identify correspondingly throughout.

DETAILED DESCRIPTION

Figure 1:
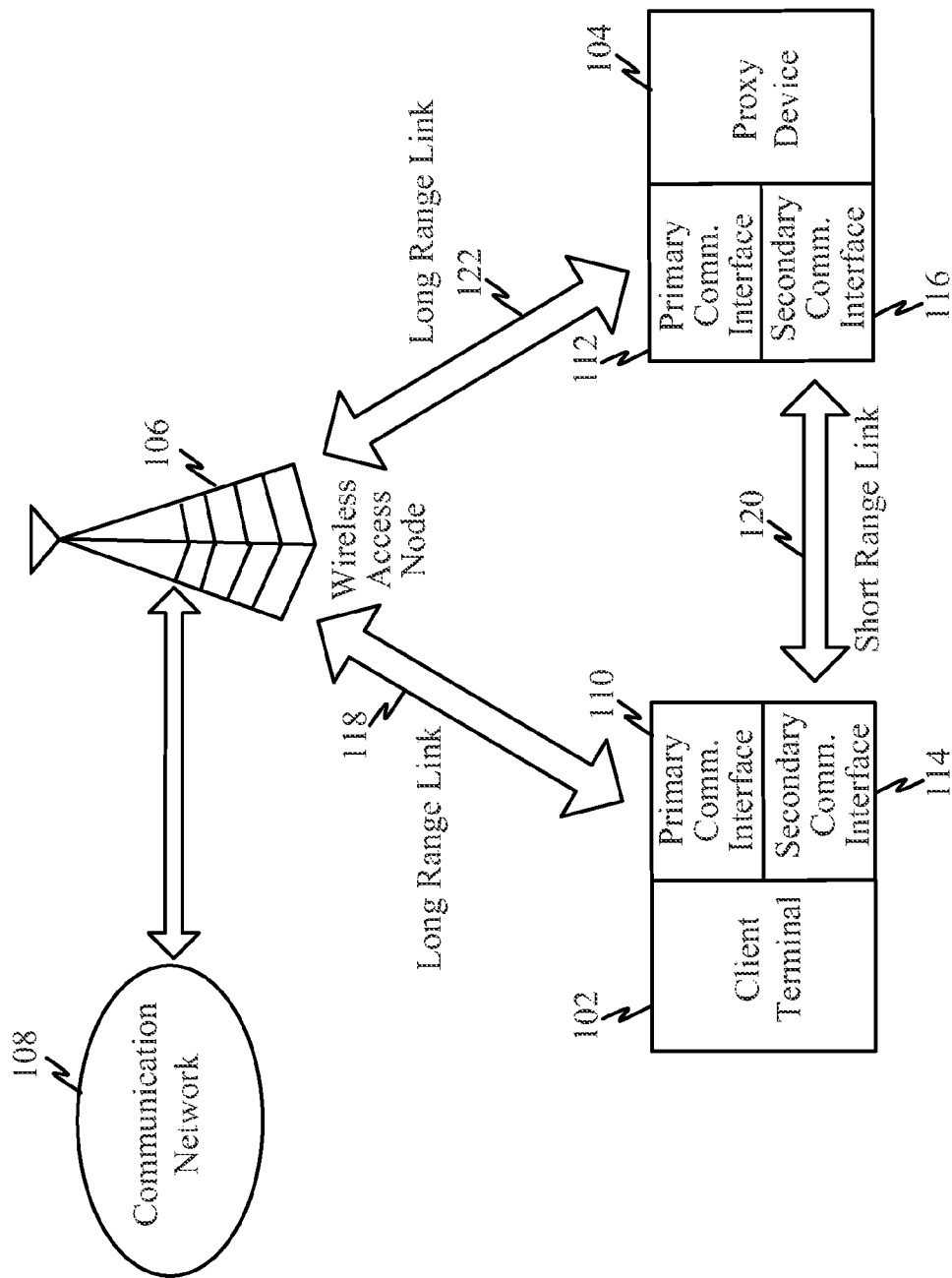
FIG. 1 is a block diagram illustrating a wireless communication system in which a proxy device may simultaneously facilitate power conservation in client terminals and increased system responsiveness.

In the following description, specific details are given to provide a thorough understanding of the described implementations. However, it will be understood by one of ordinary skill in the art that the implementations may be practiced without these specific details. For example, circuits may be shown in block diagrams in order not to obscure the implementations in unnecessary detail. In other instances, well-known circuits, structures and techniques may be shown in detail in order not to obscure the implementations.

In the following description, certain terminology is used to describe certain features of one or more implementations. For instance, the term "access node" refers to a device that facilitates wireless connectivity (for one or more client terminals) to a communication or data network. The term "access node" may include base stations, Node-B devices, femto cells, pico cells, etc. The term "client terminal" refers to mobile phones, pagers, wireless modems, personal digital assistants, personal information managers (PIMs), palmtop computers, laptop computers, and/or other mobile communication/computing devices which communicate, at least partially, through a wireless or cellular network. The term "proxy device" may include any device having wireless communication capabilities that receives incoming messages intended for a client terminal over a primary communication interface and/or forwards such incoming messages to the intended client terminal over a secondary communication interface. In some implementations, the operations and/or functionality of the proxy device may be integrated in an access node.

Overview

One feature provides a system, apparatus, and method for facilitating both power conservation in a client terminal and latency reduction in a wireless network by using a proxy device to listen for incoming messages on behalf of the client terminal while the client terminal powers down its primary communication interface (e.g., from an idle mode to a proxy mode). A client terminal may include a primary communication interface (e.g., a long range, high power interface) for receiving signals from a wireless network, and a secondary communication interface (or a short range, low power interface) for receiving signals over a short range (e.g., a few feet, or less than a mile) from nearby devices. The client terminal may be adapted to send a message to the proxy device requesting it to operate as a proxy by monitoring a signaling/control channel for the client terminal and forwarding incoming messages for the client terminal via the second communication interface. In order to improve system responsiveness (i.e., reduce latency), the client terminal may also be adapted to send a message to the access node indicating that the client terminal is monitoring the signaling/control channel at a relatively short cycle rate or even continuously. Accordingly, the access node believes the client terminal is available to receive incoming messages more frequently, or continuously. However, the primary communication interface may be powered down (e.g., an operating mode having lower power consumption than idle mode or powered off), while the client terminal monitors the secondary communication interface for forwarded incoming messages from the proxy device.

The proxy device may include a primary communication interface for communicating with the access node and a secondary communication interface for wirelessly communicating with the client terminal. The proxy device may listen for incoming messages intended for the client terminal on the client terminal's signaling/control channels initiated or sent by one of more access nodes of the wireless network in accordance with the short cycle rate indicated by the client terminal. In one example, the proxy may use its primary communication interface (similar to the primary communication interface that has been shut off by the client terminal) to listen for, or receive, the incoming messages. When the proxy device detects a message intended for a client terminal for which it is acting as a proxy, the proxy device may forward the incoming message to the client terminal via its secondary communication interface.

Upon receipt of a message from the proxy device via the secondary communication interface, the client terminal may switch to active mode, either on its own or under a wake-up signal by the proxy device, to receive incoming messages over the primary communication interface.

Exemplary Network Environments

FIG. 1 is a block diagram illustrating a wireless communication system in which a proxy device may facilitate both power conservation in client terminals and increased responsiveness. A client terminal 102 and a proxy device 104 may be capable of communicating through a communication network 108 via one or more wireless access nodes 106 (e.g., base stations or Node Bs, femto cells, pico cells, etc.) that may be part of the communication network 108. The client terminal 102 may be powered by an internal (limited) power source (e.g., battery).

The client terminal 102 and proxy device 104 may include primary (e.g., high power or long range) communication interfaces 110 and 112 (or transceivers). For example, the primary communication interfaces 110 and 112 may each include a first wireless transmitter/receiver chain that facilitates sending and/or receiving over-the-air transmissions. The primary communication interfaces 110 and 112 may enable the client terminal 102 and proxy device 104 to communicate directly with the wireless access node 106 through a first wireless link 118 and second wireless link 122, respectively, for communicating with the communication network 108. One example of a primary communication interface 110/112 may be a long range, high power, and/or high bandwidth communication interface such as a W-CDMA compliant transceiver. However, in other examples, such high power interface may operate according to various contemporary communication standards, including but not limited to W-CDMA, cdma2000, GSM, WiMax, and WLAN.

The client terminal 102 and proxy device 104 may also include secondary (e.g., low power or short range) communication interfaces 114 and 116 (or transceivers) for communicating directly with each other via a third wireless link 120. The secondary communication interfaces 114 and 116 may each include a second wireless transmitter/receiver chain that facilitates sending and/or receiving over-the-air transmissions. Note that the first and second wireless links 118 and 122 may operate on a first frequency band or channel while the third wireless link 120 may operate on a second frequency band or channel different or distinct from the first frequency band or channel. In one implementation, the secondary communication interface, also referred to as a low power interface, may consume less power than the primary communication interface which may be referred to as a high power interface. It should be clear that the terms "high power" and "low power" are relative terms and do not imply a particular level of power consumption. The secondary communication interfaces 114 and 116 simply consume less power than the primary communication interfaces 110 and 112 for a given time of operation in equivalent operating modes (e.g., idle modes). This merely recognizes that lower bandwidth and/or shorter range interfaces will consume less power than higher bandwidth and/or longer range interfaces.

One example of a secondary communication interface 114/116 may be a short range, low power, and/or low bandwidth communication interface such as a Bluetooth compliant transceiver that uses a time-division duplex (TDD) scheme. Such Bluetooth interface may alternately transmit and receive in a synchronous manner. This allows a plurality of terminals connected via Bluetooth technology to communicate in an ad hoc fashion often called piconet.

The client terminal 102 may operate in various modes, including a first mode and a second (or proxy) mode. While in the first mode, the client terminal may operate in an active mode or an idle mode. While in the active mode, the client terminal 102 may use its primary communication interface 110 to communicate with the access node 106 to establish a call/session for receiving and/or transmitting messages. In idle mode, the client terminal 102 may periodically turn on its primary communication interface 110 (e.g., awake state) to monitor one or more signaling/control channels for incoming messages (e.g., paging messages) sent by the access node 106, and may then turn off its primary communication interface 110 (e.g., sleep state) if no further communication is required. In the proxy mode, the client terminal may power down (e.g., turn off) its primary communication interface to a sleep state or some other low power state.

The frequency at which the client terminal 102 cycles between the awake state and the sleep state in idle mode may be communicated to and/or set by the access node 106 or other entity of the wireless network. For example, the access node 106 may know the client terminal 102 is in the idle mode and may set the signaling/control channel cycle rate to a conventional cycle frequency (e.g., 5.12 seconds for CDMA networks, 1.28 seconds for UMTS (WCDMA) networks). Thus, the wireless network or access node 106 expects the wireless terminal 102 to respond according to its expected operating mode (e.g., reply to page messages within a given time period, etc.).

For some applications operating on a client terminal 102, a relatively long cycle rate (e.g., every 5.12 seconds for CDMA networks, or 1.28 seconds for a UMTS (WCDMA) networks) may result in unacceptable system responsiveness. For example, in Push-To-Talk (PTT) applications (e.g., QChat), a long cycle rate results in unacceptable latency for call set up. In order to accommodate a particular application's responsiveness requirements, the client terminal 102 or the access node 106 may substantially shorten the cycle rate to monitor the signaling/control channel at a substantially greater frequency. However, as noted above, a substantially shorter cycle rate results in increased power consumption, since the client terminal 102 turns on its primary communication interface 110 more often and spends less time with the primary communication interface 110 turned off.

In order to conserve power while monitoring a signaling/control channel on a relatively short cycle rate, the client terminal 102 may be configured to unilaterally change its operating mode (or at least the operating state of the primary communication interface 110) from a first (idle) mode to a second (proxy) mode. Due to this change in operating mode, the primary communication interface 110 may be powered down (e.g., turned off or put to a low power mode), thereby conserving power. As used herein, the terms short cycle rate and long cycle rate are relative terms and do not imply a particular cycle timing. The long cycle rate is simply a longer cycle frequency than the short cycle rate. By way of example and not limitation, for at least some implementations, a short cycle rate may include a cycle rate ranging between continuous, or substantially continuous, to about 5.12 seconds or 1.28 seconds. In various other examples, the short cycle rate may include a cycle rate of approximately 1 second, 800 milliseconds, 500 milliseconds, 300 milliseconds, 200 milliseconds, or 100 milliseconds or less. Although "continuous" or "continuously" may be used herein to indicate a value for a cycle rate, such terms may indicate that no cycling between on and off occurs. Rather, "continuous" or "continuously" may refer herein to implementations where a communication interface remains on for a period of time without turning off.

Prior to changing from the idle mode to the proxy mode, the client terminal 102 may request that the proxy device 104 act as its proxy for monitoring its signaling/control channel(s) with the access node 106. That is, the client terminal 102 may find local or nearby proxy devices by scanning on its primary communication interface 110 (e.g., monitoring for messages from proxy devices over a common wireless channel) and/or secondary communication interface 114 (e.g., monitoring for signals indicating the presence of proxy devices). In some implementations, the secondary communication interface 114 may be used to scan for proxy devices since it is the interface that will be used to receive messages from the proxy device 104 when the client terminal switches to proxy mode. In performing such a scan, the client terminal 102 may attempt to identify potential proxy devices that have both a primary communication interface and a secondary communication interface. This is so that a proxy device 104 is able to receive incoming messages via its primary communication interface 112 (e.g., page messages from the access node 106 intended for the client terminal 102) and forward them to the intended client terminal 102 via the secondary communication interface 116.

When one or more proxy devices are identified by the client terminal 102, it may select one proxy device 104 to serve as its "proxy" based on which available proxy device has the best or strongest short range link as measured or perceived at the client terminal's secondary communication interface 114. The client terminal 102 may send a proxy request to the selected proxy device 104 along with its signaling/control channel parameters. In some implementations, the client terminal 102 may pre-establish a secure relationship with one or more proxy devices. By pre-establishing a secure relationship, the client terminal 102 may trust the selected proxy device 104 to forward incoming messages it detects for the client terminal 102.

In implementations where the selected proxy device 104 and client terminal 102 are both listening to the same access node 106 in the wireless network, their clocks are already synchronized by virtue of listening to the same access node. In an alternative implementation, the client terminal 102 may instead provide clock information for the signaling/control channels so that the proxy device 104 can synchronize its own clock to it in order to synchronize for any relevant signaling/control channel cycle rate.

Once the proxy device 104 has been identified and selected, a communication link may be established or setup via the secondary communication interfaces 114 and 116 of the client terminal 102 and proxy device 110, respectively. For example, if the secondary communication interface 116 is a Bluetooth compliant interface, the proxy device 112 may be configured to operate according to a pseudo-random sequence called a hop sequence or frequency hop sequence so that the proxy device 110 and the client terminal 102 can communicate with each other via their respective secondary communication interfaces 116 and 114.

Once the selected proxy device 104 has been established as a proxy for the client terminal 102, the client terminal 102 may notify the wireless network and access node 106 that the client terminal 102 is monitoring the signaling/control channel on a short cycle rate. As noted above, in some non-limiting implementations, the client terminal 102 may indicate to the wireless network and access node 106 that the client terminal 102 is monitoring the signaling/control channel continuously or on a short cycle rate of about, for example, 1 second, 800 milliseconds, 500 milliseconds, 300 milliseconds, 200 milliseconds, or 100 milliseconds or less.

When the proxy device 104 has been established as a proxy for the client terminal 102, the client terminal 102 may further change its operating mode (e.g., from idle mode to proxy mode) without informing the wireless network (e.g., access node 106) for the primary communication interface 110. In changing to the proxy mode, the client terminal 102 may power down (or turn off) all or part of its primary communication interface 110 and may activate its secondary communication interface 114 to monitor for and receive messages via the proxy device 104. As the primary communication interface 110 consumes more power than the secondary communication interface 114, powering down the primary communication interface 110 (or lowering its operating state) at least for relatively long intervals and using the secondary communication interface 114 to monitor for and receive incoming messages via the proxy device facilitates power conservation at the client terminal 102.

The selected proxy device 104 monitors the signaling/control channel(s) of the client terminal 102 over its primary communication interface 112 continuously or according to the short cycle rate indicated to the access node 106 and forwards any messages intended for the client terminal 102 via the secondary communication interface 116, 114. Because the wireless network and the access node 106 have been notified that client terminal 102 is monitoring the signaling/control channel(s) continuously or on a short cycle rate, the wireless network may send messages (e.g., a PTT Announce Call message) more quickly upon receiving the messages, instead of waiting until the next monitoring cycle. In at least some examples in which the client terminal 102 indicates to the access node 106 that the client terminal 102 is monitoring continuously, or at least substantially continuously, the access node 106 may send messages immediately, or substantially immediately, upon receiving the messages. Sending messages, such as page messages, more quickly (e.g., immediately or substantially immediately) facilitates a reduction in latency in the system. Thus, the system responsiveness is improved while power conservation (at the client terminal 102) is simultaneously increased. The proxy device 104 may similarly act as a "proxy" for a plurality of other client terminals by monitoring their respective signaling/control channels and forwarding messages via its secondary communication interface 116 to the intended client terminal.

According to one feature, the proxy scheme between the client terminal 102 and the proxy device 104 may be transparent to the rest of the communication system, including the wireless network and access node 106. Therefore, the access node 106 is not informed that the client terminal 102 has changed to a proxy mode, and still believes it is operating in an idle mode on its own. Therefore, the proxy scheme is transparent to the access node 106 and it need not modify its operations or the way it communicates with the client terminal 102.

The power conservation and latency reduction techniques described herein may be implemented on various types of wireless communication systems such as Code Division Multiple Access (CDMA) systems, Time Division Multiple Access (TDMA) systems, Frequency Division Multiple Access (FDMA) systems, Orthogonal Frequency Division Multiple Access (OFDMA) systems, Worldwide Interoperability for Microwave Access (Wi-Max). A CDMA system may implement a radio access technology (RAT) such as Wideband CDMA (W-CDMA), CDMA2000, and so on. RAT refers to the technology used for over-the-air communication. A TDMA system may implement a RAT such as Global System for Mobile Communications (GSM). Universal Mobile Telecommunication System (UMTS) is a system that uses W-CDMA and GSM as RATs and is described in documents from a consortium named "3rd Generation Partnership Project" (3GPP). CDMA2000 is described in documents from a consortium named "3rd Generation Partnership Project 2" (3GPP2). 3GPP and 3GPP2 documents are publicly available.

In some implementations described herein, the functionality of a proxy device may be integrated into a terminal or an access node. For instance, an access node may have both a primary communication interface, which is normally used to communication with the terminals being served, and a secondary communication interface compatible with the secondary communication interfaces for the terminals being served. In this particular configuration, since the secondary interface is located on the access node (which typically has a plentiful power supply), it may be able to boost the operating transmission range of its secondary communication interface beyond the typical transmission range of such power interfaces. In this manner, an access node may be able to forward received messages (e.g., page messages) over its secondary communication interface to the corresponding secondary communication interfaces of served terminals (e.g., client terminals) that have shut off primary communication interfaces.

Frequent or Continuous Channel Monitoring Using Proxy Device

Figure 2:
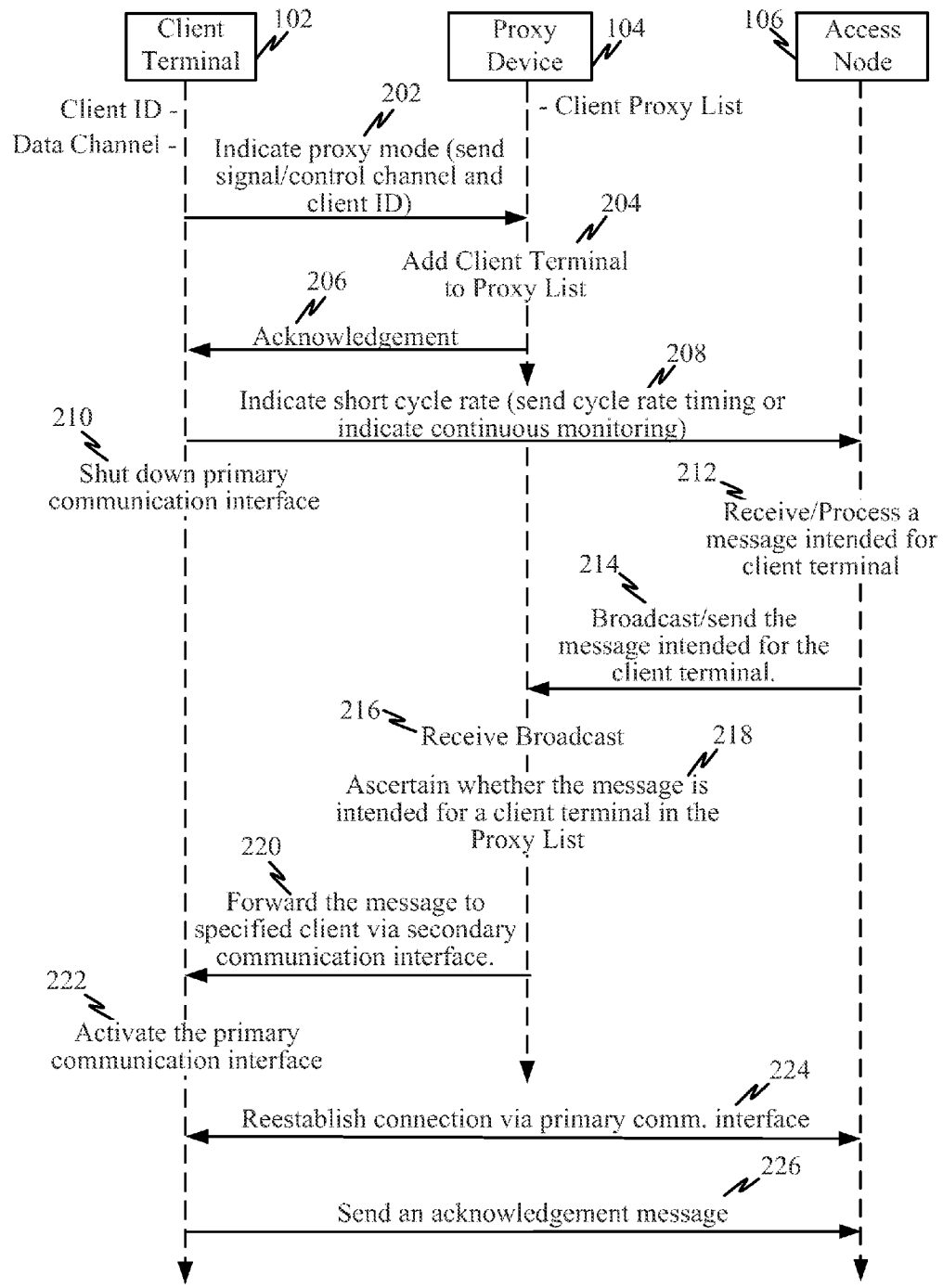
FIG. 2 is a flow diagram illustrating the operation of a wireless communication system according to at least one example in which a proxy device facilitates both increased system responsiveness and power conservation in client terminals.

FIG. 2 is a flow diagram illustrating the operation of a wireless communication system where a proxy device facilitates improved system responsiveness and power conservation in client terminals. In this example, the client terminal 102, proxy device 104, and access node 106 of FIG. 1 are used for illustration purposes. The client terminal 102 may store a Client Identifier (ID) and/or signaling/control channel information for the channel of the client terminal 102. The proxy device 104 may maintain a client proxy list of the client identifiers and signaling/control channels of the client terminals for which the proxy device 104 is acting as a proxy.

When the client terminal 102 wishes to conserve power while maintaining or increasing responsiveness, it may indicate to the proxy device 104 to operate as its proxy by sending its signaling/control channel(s) and client ID 202. Using the client ID, the proxy device 104 then adds the identifier of the client terminal 102 to its proxy list 204 and sends an acknowledgement 206 to the client terminal 102 to acknowledge receipt of the information. After receiving the acknowledgement 206, a communication link has been effectively setup between the client terminal 102 and proxy device 104.

Conventionally, when a message, such as a page message, intended for a particular client terminal is received at an access node, the access node must schedule the message to be sent to the intended client terminal at a time when the client terminal will be monitoring its signaling/control channel. Since conventional client terminals typically operate to conserve battery life, the time period between monitoring cycles may be substantially long, resulting in a substantial wait time before the access node can send the message to the client terminal, and introducing additional delay (or latency) into the communication system.

According to at least one feature for reducing or even eliminating such delay, the client terminal 102 may convey a message 208 to the access node 106 indicating that the client terminal 102 will monitor its signaling/control channel(s) continuously or on a short cycle rate. By way of example and not limitation, the client terminal 102 may indicate that it is monitoring its signaling/control channel(s) at a cycle rate of about 5.12 seconds or less. In some implementations, the client terminal 102 may indicate a cycle rate of, for example, about 1 second, 800 milliseconds, 500 milliseconds, 300 milliseconds, 200 milliseconds, or 100 milliseconds or less. In some implementations, the client terminal 102 may indicate that it is monitoring its signaling/control channel(s) continuously. The average wait time for scheduling a message is typically about half the cycle rate. Therefore, a conventional cycle rate of about 5.12 second may result in an average delay time of about 2.56 seconds. By contrast, a short cycle rate of, for example, about 300 milliseconds may result in an average delay time of about 150 milliseconds, while continuously monitoring the signaling/control channel(s) may result in substantially little to no added delay time for the communication system.

Typically, a client terminal operating its primary communication interface according to a cycle rate that is substantially less than a conventional 5.12 seconds may consume significantly more current than the 1 mA of current generally consumed by a 5.12 second cycle rate. Therefore, according to another feature, the client terminal 102 conserves substantial amounts of power by shutting down (or powering down) its high-power primary communication interface 210 (e.g., switching from idle mode to proxy mode) while maintaining its low-power secondary communication interface 210 active to communicate with the proxy device 104.

The access node 106 may receive a message, such as a page message 212 intended for the client terminal 102. For example, in one implementation the access node 106 may receive a PTT (e.g. QChat) Announce Call message intended for the client terminal 102. The access node 106 may process the received message (e.g., page message, such as a PTT Announce Call message) to be broadcast/sent according to the cycle rate indicated by the client terminal 102. That is, the access node 106 may schedule the message to be sent to the client terminal 102 according to the indicated cycle rate (i.e., at a time when the client terminal 102 will be monitoring its signaling/control channel(s)). Because the client terminal 102 indicated a short cycle rate, the time period until the next cycle will be relatively short. For example, if the client terminal 102 indicated a short cycle rate that is continuous or at least substantially continuous, the access node 106 may immediately broadcast/send the message for the client terminal 102.

The access node 106 may broadcast/send the message 214 (e.g., as one or more packet transmissions) intended for the client terminal 102, and the proxy device 104 may receive the broadcast 216 over its primary communication interface. Once the broadcast has been received, the proxy device 104 may ascertain whether the incoming message is intended for a client terminal 102 in its proxy list 218. The proxy device 104 may forward the incoming message to the specified client terminal 102 via its secondary communication interface 220 if the message is intended for a client terminal in the proxy list of the proxy device 104.

The client terminal 102 may receive the incoming message via its secondary communication interface. Upon receipt of the message via its secondary communication interface, the client terminal 102 may activate its primary communication interface 222. In some implementations, the proxy device 104 may send a wake-up signal to the client terminal 102 via the secondary communication interface which causes the client terminal 102 to activate its primary communication interface. Upon activation of its primary communication interface, the client terminal 102 may reestablish a connection with the access node 106 via the primary communication interface 224 to the access node 106. The client terminal 102 may then send an acknowledgement message (e.g., an Accept Call message) 226.

For example, in the PTT implementation referred to above, the client terminal 102 may receive the Announce Call message from the proxy device 104 over its secondary communication interface, activate its primary communication interface, and send an Accept Call message to the access node 106 via its primary communication interface. Upon receipt of the call acceptance message by the originating PTT terminal, the client terminal 102 and originating PTT terminal may commence media communication between the two terminals.

Responding to a Message Using Proxy Device

Figure 3:
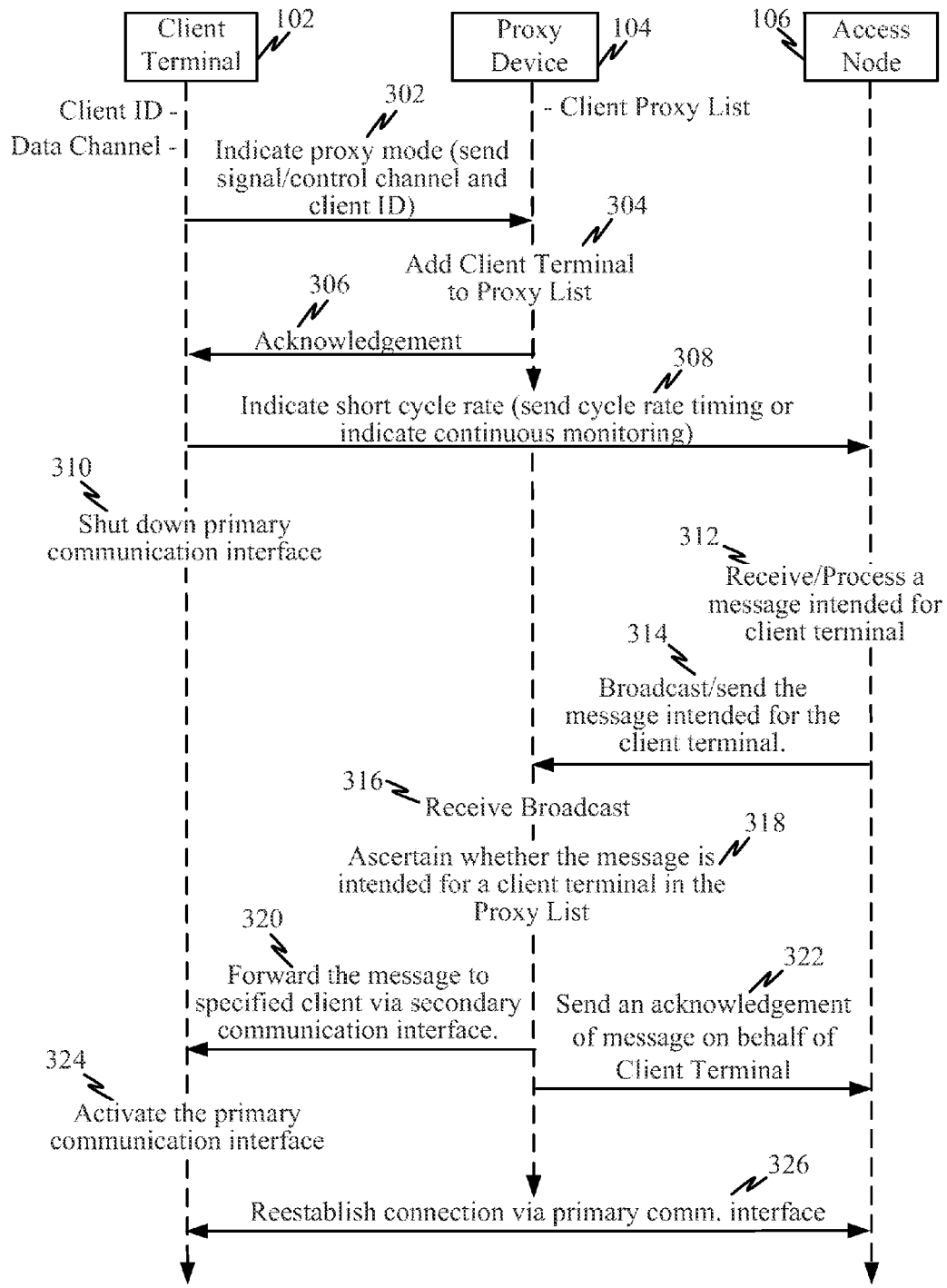
FIG. 3 is a flow diagram illustrating the operation of a wireless communication system according to another example in which a proxy device facilitates both increased system responsiveness and power conservation in client terminals.

FIG. 3 is a flow diagram illustrating the operation of a wireless communication system according to another example in which a proxy device responds to an incoming message, such as a page message, on behalf of the client terminal. The operation of the wireless communication system illustrated in FIG. 3 is similar to that illustrated in FIG. 2 and described above. In order to avoid needless repetition, detailed descriptions will be directed primarily to those features which differ from FIG. 2. Generally, the client terminal 102 may employ (e.g., 302-306) the proxy device 104 to monitor its signaling/control channel(s) and may indicate to the access node 106 that the client terminal 102 is monitoring such channels on a short cycle rate 308. The client terminal 102 may then shut down (or power down) its primary communication interface 310. The access node 106 may receive and process an incoming message 312 (e.g., a page message, such as a PTT Announce Call message, etc.) intended for the client terminal 102, and broadcast/send the message 314 intended for the client terminal 102. The proxy device 104 may receive the broadcast 316 over its primary communication interface, ascertain whether the message is intended for a client terminal 102 in its proxy list 318, and forward the message to the specified client terminal 102 via its secondary communication interface 320. In some implementations, the proxy device 104 may send a wake-up signal to the client terminal 102 via the secondary communication interface which causes the client terminal 102 to activate its primary communication interface.

In the implementation illustrated in FIG. 3, latency resulting from the time required for the client terminal 102 to receive the forwarded message, to activate its primary communication interface and then to send an acknowledgement to the access node 106 may be reduced by employing the proxy device 104 to send the acknowledgement to the access node 106. In particular, the proxy device 104 may send the acknowledgement 322 to the access node 106 on behalf of the client terminal 102 while the client terminal 102 activates its primary communication interface 324.

The client terminal 102 may receive the message from the proxy device 104 via its secondary communication interface. Upon receipt of the message via its secondary communication interface, the client terminal 102 may activate its primary communication interface 324 and may reestablish a connection with the access node 106 via the primary communication interface 326.

For example, in a PTT implementation (e.g., QChat), an Announce Call message that is broadcast/sent from the access node 106 for the client terminal 102 is received by the proxy device 104. Upon receipt of the Announce Call message, the proxy device 104 may send an Accept Call message to the access node 106 on behalf of the client terminal 102. Upon receipt of the Accept Call message by the originating PTT terminal, the client terminal 102 and originating PTT terminal may commence media communication between the two terminals.

Call Initiation Using Proxy Device Assistance

Figure 4:
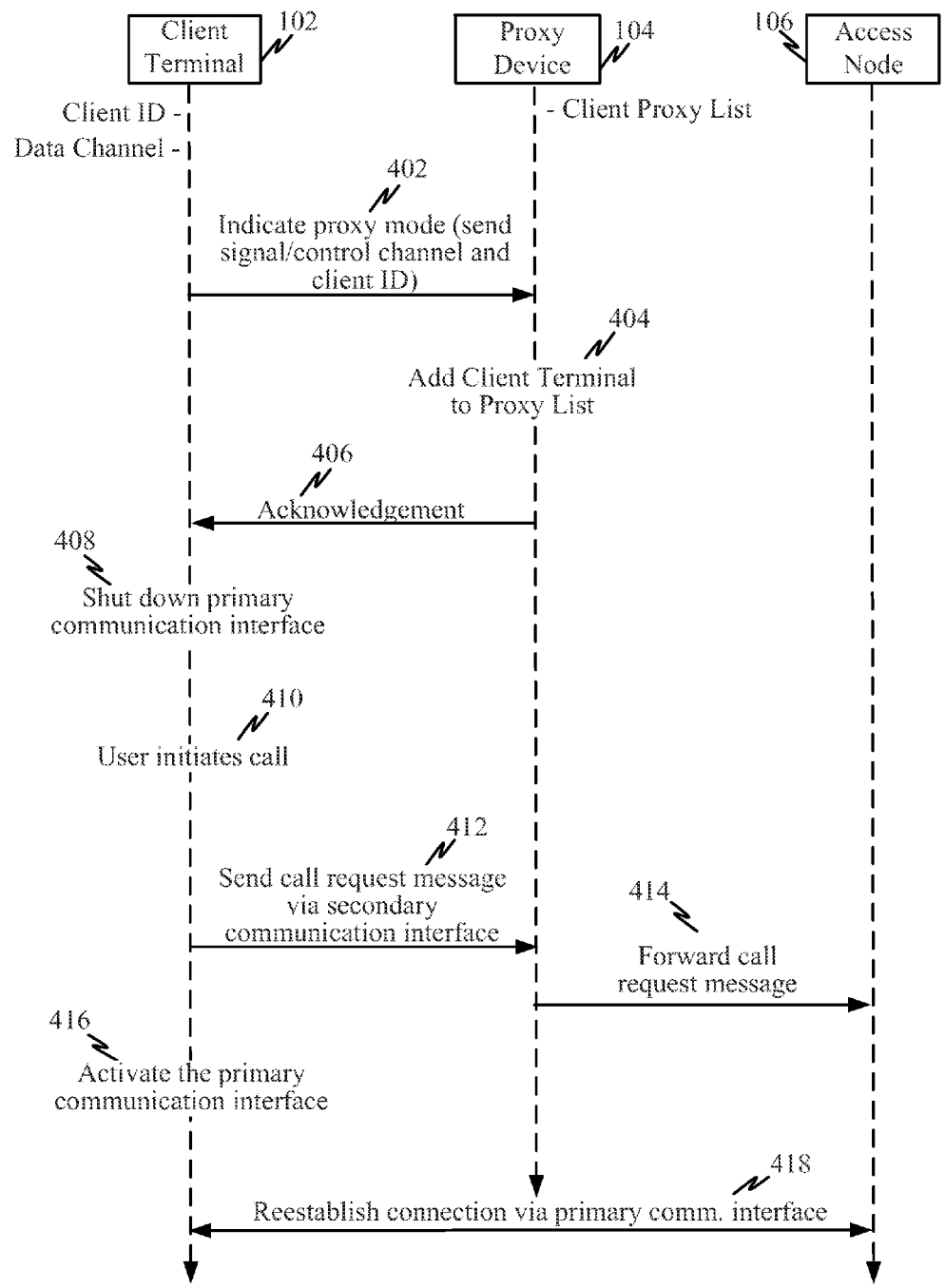
FIG. 4 is a flow diagram illustrating an example of call initiation where a client terminal may send a call request to a proxy device over a second communication interface and employ the proxy device to forward a call request message to the access node.

FIG. 4 is a flow diagram illustrating an example of call initiation where a client terminal may send a call request to a proxy device over a second communication interface and employ the proxy device to forward a call request message to the access node. As noted above, with reference to FIGS. 1, 2 and 3, the client terminal 102 may store a Client Identifier (ID) and/or signaling/control channel information for the channel of the client terminal 102. The proxy device 104 may maintain a client proxy list of the client identifiers and signaling/control channels of the client terminals for which the proxy device 104 is acting as a proxy.

The client terminal 102 may indicate to the proxy device 104 to operate as its proxy by sending its signaling/control channel(s) and client ID 402. Using the client ID, the proxy device 104 then adds the identifier of the client terminal 102 to its proxy list 404 and sends an acknowledgement 406 to the client terminal 102 to acknowledge receipt of the information. After receiving the acknowledgement, a communication link has been effectively setup between the client terminal 102 and proxy device 104.

Upon receiving the acknowledgement from the proxy device 104, the client terminal 102 may conserve power by shutting down (or powering down) its high-power primary communication interface 408 (e.g., switching from idle mode to proxy mode) while maintaining its low-power secondary communication interface active to communicate with the proxy device 104.

While the primary communication interface is powered down, a user may initiate a call 410 using the client terminal 102. For example, a user may select a user address (e.g., phone number, PTT identifier) for another client terminal and may press a send button. When the client terminal imitates the call, a call request message may be generated to be sent to the receiving client terminal requesting a call setup between the two terminals. Since the primary communication interface is powered down, a substantial amount of time may be required to activate the primary communication interface prior to sending the call request message. Accordingly, the client terminal 102 may be adapted to send the call request message to the proxy device 104 using its secondary communication interface 412, which is active, instead of its primary communication interface, which is powered down. The call request message may be forwarded 414 to the network (or access node 106) by the proxy device 104 before or while the client terminal 102 activates its primary communication interface 416 and reestablishes a connection to the access node 106 via its primary communication interface 418.

Using the secondary communication interface to send the call request message from the client terminal 102 to the proxy device 104 may significantly reduce the delay experienced by conventional terminals from the time required for the client terminal 102 to activate its primary communication interface and establish a connection to the access node 106 via its primary communication interface.

Exemplary Push-to-Talk Implementation Using Proxy Device Assistance

Figure 9:
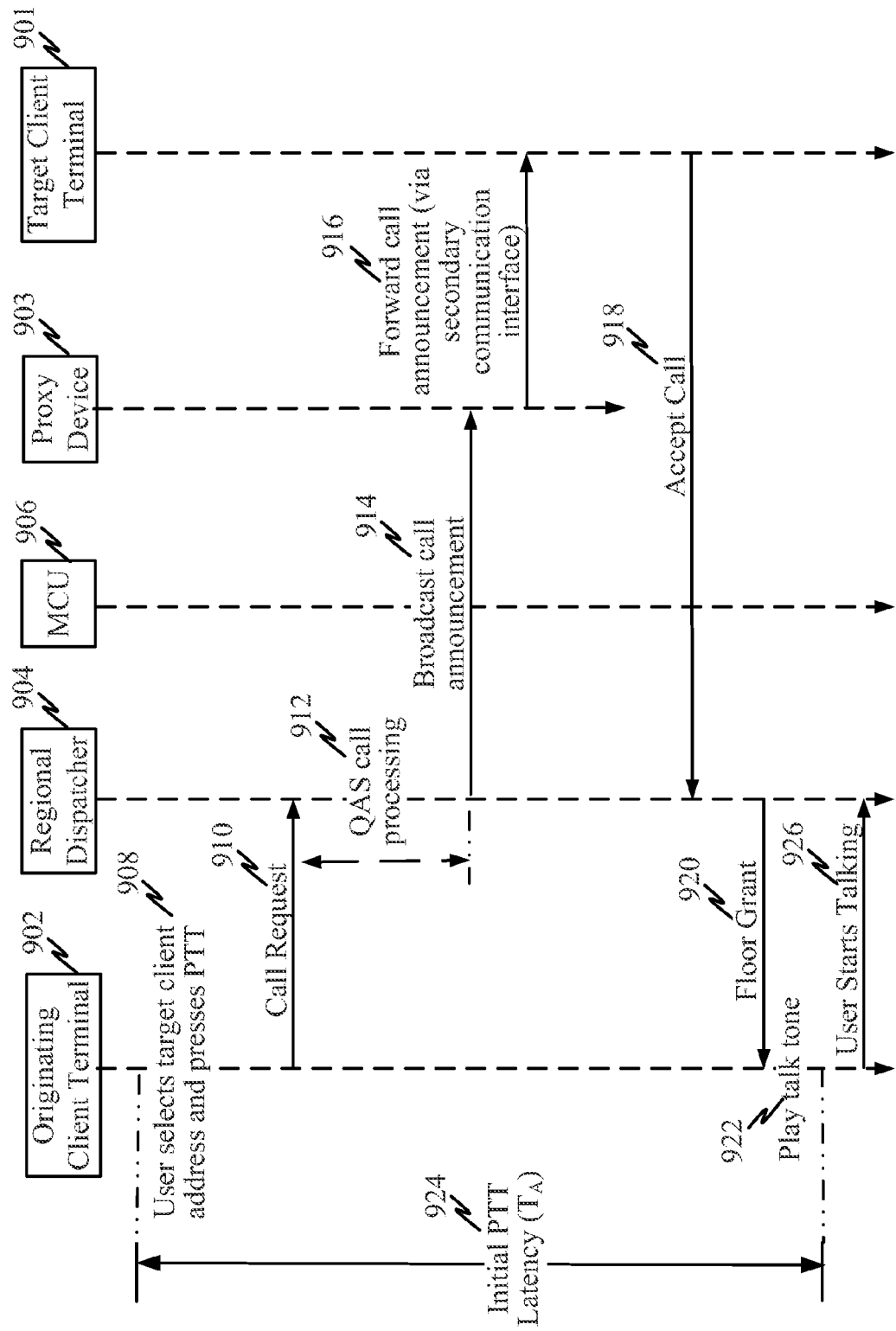
FIG. 9 is a flow diagram illustrating an example of a push-to-talk implementation where a client terminal may use a proxy device to improve power conservation and reduce latency in call setup.

FIG. 9 is a flow diagram illustrating an example of a push-to-talk implementation where a client terminal may use a proxy device to improve power conservation and reduce latency in call setup. As noted above, with reference to FIGS. 1, 2 and 3, a client terminal 102 may operate in a proxy mode using a proxy device 104 to monitor one or more signaling/control channel(s). In this example, an originating client terminal 902 wishes to initiate and establish a push-to-talk (PTT) call with a target client terminal 901. Communications between the originating client terminal 902 and target client terminal 901 may be achieved via a wireless communication network comprising, for example, a regional dispatcher 904 (e.g., an access node, etc.) and a multipoint control unit (MCU) 906. In this example, a proxy device 903 may be assisting the target client terminal 901 while the target client terminal 901 operates in a proxy mode (e.g., an operating mode in which a primary or first communication interface has lower power consumption than an idle mode). In some examples, such proxy mode may be a low power mode in which the target client terminal 901 operates its primary (or first) communication interface so that it is partially or fully powered off.

A user of an originating client terminal 902 may select the target client terminal 901 with which the user desires to communicate. For example, the user may select the target client terminal's address (e.g., phone number) and may press a push-to-talk button 908 to initiate the communication session. The originating client terminal 902 then sends a call request 910 to the regional dispatcher 904. The regional dispatcher 904 may comprise a network entity adapted to communicate between other network entities and to forward communications to the MCU 906.

Upon receipt of the call request by the regional dispatcher 904, a QChat Application Server (QAS), for example, executed at the regional dispatcher 904 may perform call processing 912 and may broadcast/send an Announce Call message according to a cycle rate indicated by the target client terminal 901. The target client terminal 901 may have advertised to the regional dispatcher 904 that the target client terminal 901 is monitoring for such page messages according to a short cycle rate, or even continuously, although the target client terminal 901 is using the proxy device 104 to monitor for call requests on behalf of the target client terminal 901, as set forth with reference to FIGS. 1-3. Accordingly, the regional dispatcher 904 may broadcast/send a call announcement message 914 intended for the target client terminal 901 relatively quickly or immediately upon receipt, depending on the cycle rate advertised by the target client terminal 901.

In this example, the proxy device 903 is monitoring for call announcements on behalf of the target client terminal 901.

While the regional dispatcher 904 believes that the target client terminal 901 is monitoring a signaling/control channel at a short cycle rate, the target client terminal 901 is in fact monitoring the signaling/control channel at a longer cycle rate or not monitoring it at all. Using the proxy device 903 to monitor for call announcements on behalf of the target client terminal 901, while the regional dispatcher 904 believes that the target client terminal 901 is monitoring according to the short cycle rate, may substantially reduce the QAS call processing 912 since the regional dispatcher 904 may broadcast the call announcement 914 relatively more quickly (on average) than it would according to a relatively longer cycle rate.

The proxy device 903, which is monitoring the signaling/control channel(s) on behalf of the target client terminal 901 may receive the call announcement intended for the target client terminal 901 and may forward the announcement to the target client terminal 901 via its secondary communication interface 916. Upon receiving the call announcement 916, the target client terminal 901 may activate the primary communication interface (e.g., from proxy mode to a connected or idle mode) and sends an accept call 918 message (via the primary communication interface) to the regional dispatcher 904. A floor grant 920 may then be sent from the network (e.g., regional dispatcher 904) to the originating client terminal 902. The originating client terminal 902 may then play a talk tone 922 for the user indicating that the call request has been accepted and the user is free to start talking 926 with the target client terminal 901.

The target client terminal 901 operates in proxy mode transparent or unknown to the network (e.g., regional dispatcher 904), thereby maintaining a relatively low (control/signal channel monitoring) cycle rate from the point of view of the network. This allows the network to more quickly perform QAS call processing 912 and substantially or significantly reduce the initial PTT latency ($T_A$) 924. For example, use of a short control/signal channel monitoring cycle rate may achieve an initial PTT latency ($T_A$) 924 that decreases latency by about, for example, 85 to 90 milliseconds.

Figure 10:
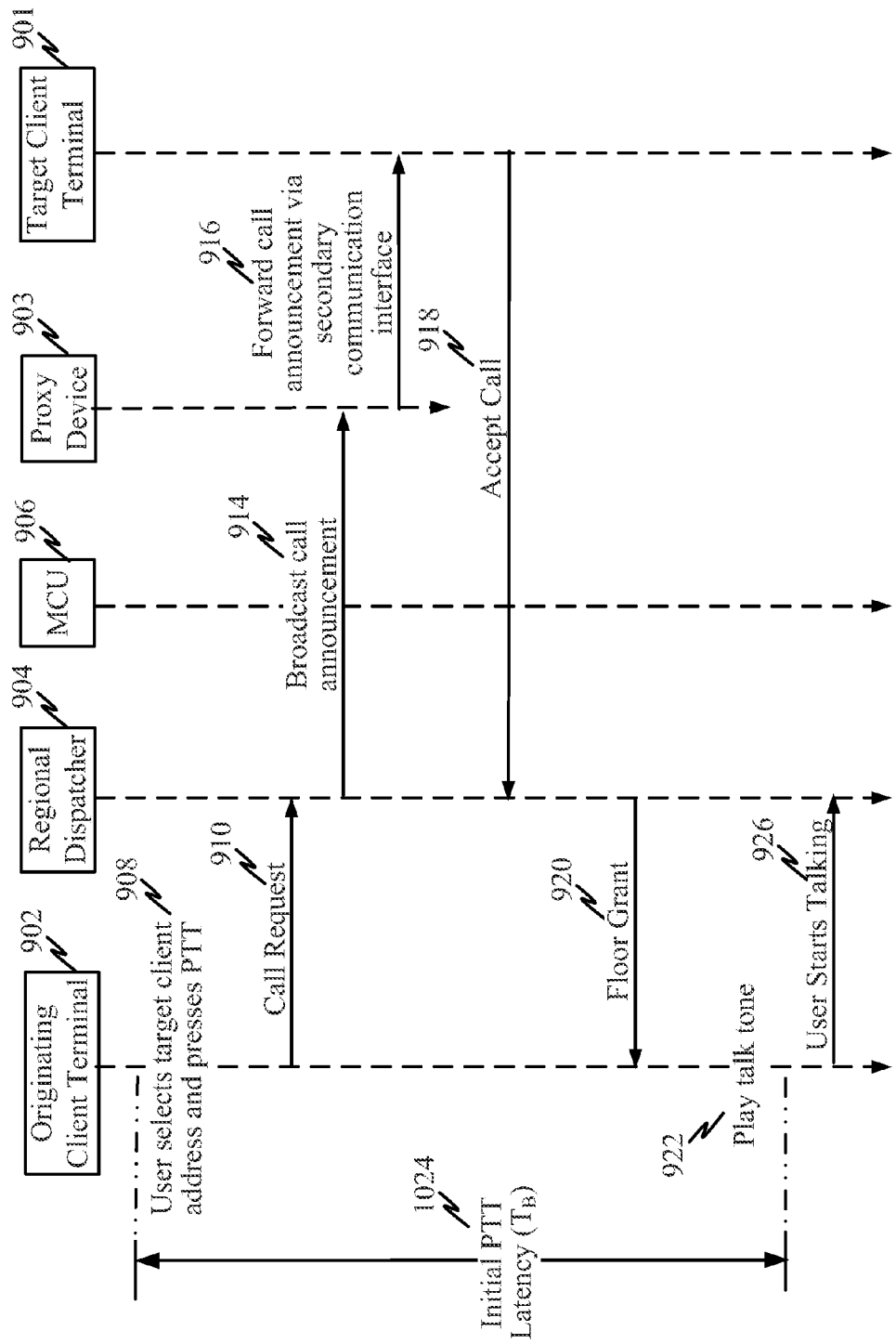
FIG. 10 illustrates an alternative to the flow diagram in FIG. 9 to further reduce latency in call setup.

FIG. 10 illustrates an alternative to the flow diagram in FIG. 9 to further reduce latency in call setup. In this alternative approach, upon the target client terminal 901 requesting the proxy device 903 to act as its proxy, the target client terminal 901 notifies a QChat Application Server (e.g., operating on the regional dispatcher 904) that it is continuously monitoring the control/signal channel. Therefore, the regional dispatcher 904 can avoid or reduce the QAS call processing 912 (FIG. 9) because it can send or broadcast the call announcement 914 instantly (e.g., without the delay of waiting for target client terminal's paging cycle). On average, half of the paging cycle delay may be eliminated in this matter. Use of a short control/signal channel monitoring cycle rate may achieve an initial PTT latency ($T_B$) 1024 that reduces latency by about, for example, an additional 15 to 20 milliseconds.

Figure 11:
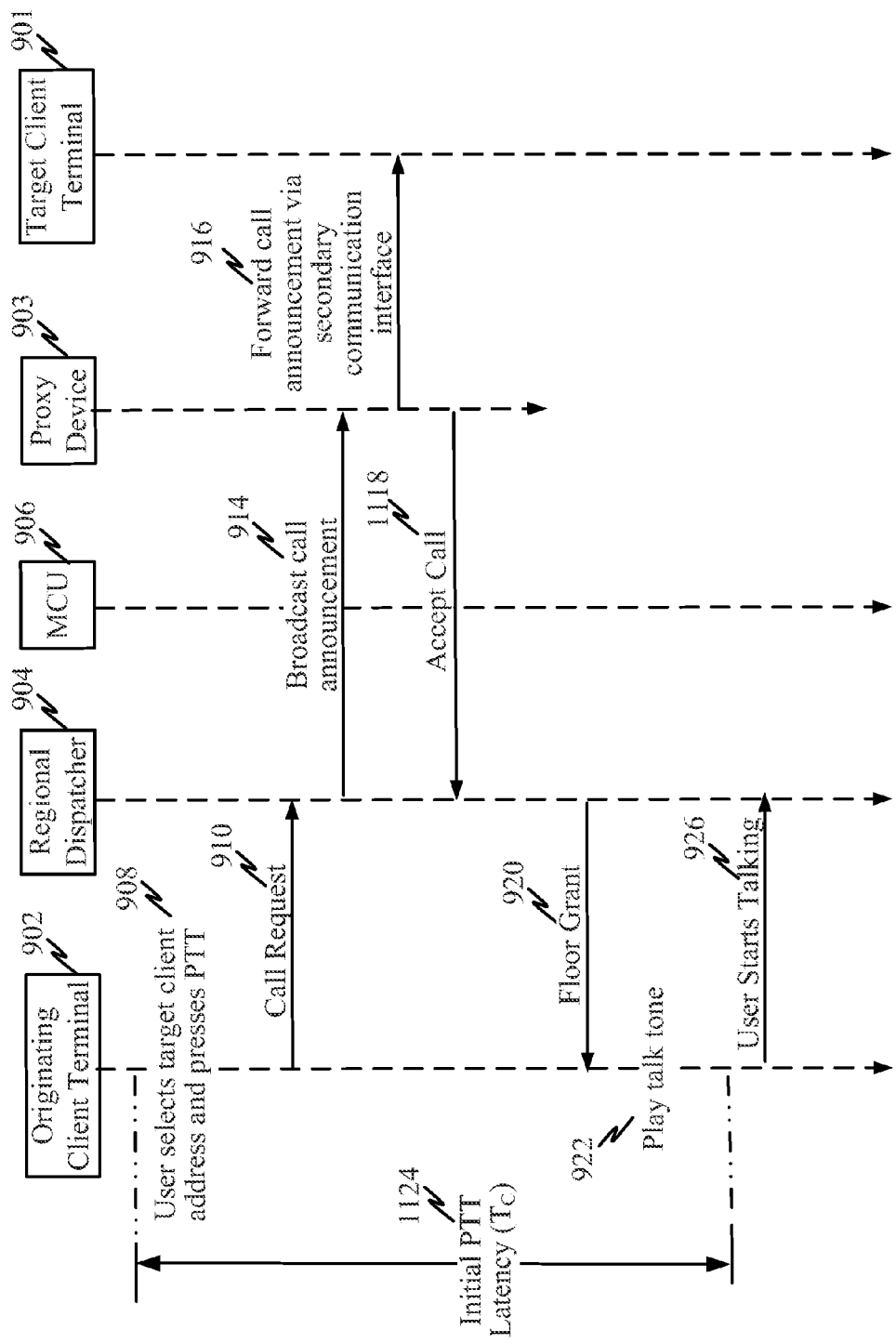
FIG. 11 illustrates yet another alternative to the flow diagram in FIG. 9 to further reduce latency in call setup.

FIG. 11 illustrates yet another alternative to the flow diagram in FIG. 9 to further reduce latency in call setup. In this alternative approach, similar to the approach of FIG. 10, upon the target client terminal 901 requesting the proxy device 903 to act as its proxy, the target client terminal 901 notifies a QChat Application Server (e.g., operating on the regional dispatcher 904) that it is continuously monitoring the control/signal channel. Therefore, the regional dispatcher 904 can avoid or reduce the QAS call processing 912 (FIG. 9) because it can send or broadcast the call announcement 914 instantly (e.g., without the delay of waiting for target client terminal's paging cycle). Additionally, upon receiving the call announcement 914, the proxy device 903 not only forwards it to the target terminal 901 but also sends an accept call 1118 message to the regional dispatcher 904 on behalf of the target client terminal 901. In this approach, the target client terminal 901 knows that the proxy device 903 has sent the accept call 1118 on its behalf and therefore does not need to send the accept call message itself. Use of a short control/signal channel monitoring cycle rate may achieve an initial PTT latency ($T_C$) 1124 that reduces latency by about, for example, an additional 100 milliseconds.

Exemplary Client Terminal

Figure 5:
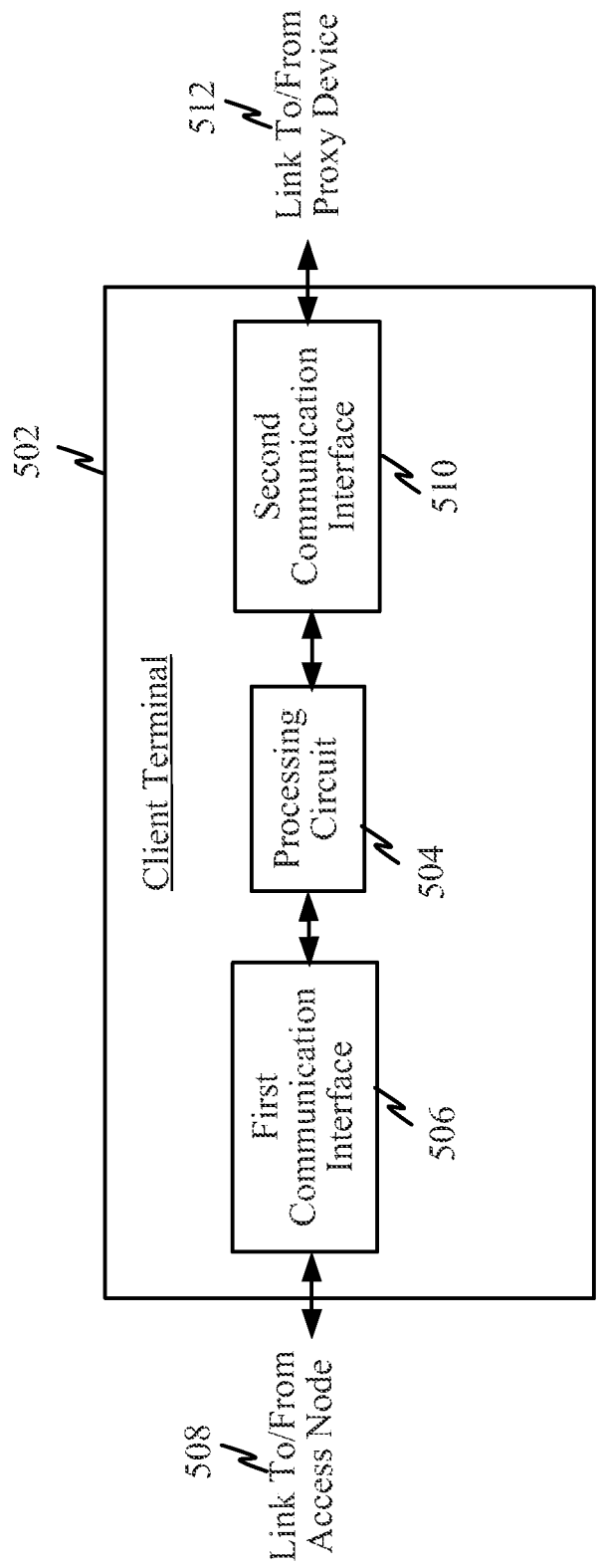
FIG. 5 is a block diagram of an example of a client terminal configured for power conservation and reduced latency by using a proxy device.

FIG. 5 is a block diagram of an example of a client terminal configured for power conservation and reduced latency by using a proxy device. The client terminal 502 may include a processing circuit 504, such as a small and/or low-power microprocessor. The client terminal 502 may also include a first (e.g., primary) communication interface 506 that allows the client terminal 502 to communicate with devices on a first wireless network, e.g., via a link to/from a network access node 508. For example, the first communication interface 506 may be a high power communication interface used for long range communications, such as over a CDMA-compliant network. The client terminal 502 may also include a second (e.g., secondary) communication interface 510 communicatively coupling the client terminal 502 to devices on a second wireless network, such as a direct wireless link to a proxy device 512. For example, the second communication interface 510 may be a low power communication interface used for short range communications, such as over a Bluetooth-compliant network. The client terminal 502 may be battery-powered and the amount of power such battery can provide is limited.

In conventional approaches, the first communication interface of the client terminal is active (or powered on), either continuously (e.g., continuous monitoring in idle mode) or periodically (e.g., in slotted idle mode) to listen for incoming messages (e.g., paging messages), draining the power from the internal power source (e.g., battery) of the client terminal. For instance, a signaling/control channel may be a frequency band that is shared among client terminals for a wireless network in a synchronous fashion, in which the client terminal may be assigned specific frames on which it may receive terminal-specific messages. With such a signaling/control channel, the client terminal can enter discontinuous reception operation (e.g., DRX) whereby it periodically, rather than continuously, monitors the signaling/control channel for messages using its first communication interface. While in discontinuous reception operation, the client terminal cycles between a "sleep" state and an "awake" state. That is, the client terminal wakes up from the sleep state prior to its assigned frame, enters the awake state and processes or monitors the signaling/control channel for messages during its assigned frame, and reverts back to the sleep state if additional communication is not required.

A longer cycle rate (i.e., longer time between assigned frames) in discontinuous reception operation conserves greater power, but introduces additional latency into the wireless system, since the access node must wait until the next assigned frame to send any messages. In some applications, conventional cycle rates (e.g., every 5.12 seconds) may result in unacceptable system responsiveness due to the additional latency. For example, in a client terminal adapted for Push-To-Talk (PTT) applications, a long cycle rate may result in unacceptable latency for call set up. In order to accommodate a particular application's responsiveness requirements, the client terminal or the access node may substantially increase the cycle rate to monitor the signaling/control channel at a substantially greater frequency. However, a substantially shorter cycle rate results in increased drain to the internal battery of the client terminal due to the primary communication interface being powered on more often.

According to at least one feature, the client terminal 502 may be adapted to improve power savings and reduce latency by using an external or separate proxy device. To achieve improved power savings and reduced latency, the client terminal 502 may be adapted to perform one or more operations via its processing circuit 504, first communication interface 506 and/or second communication interface 510.

The client terminal 502 may improve power savings by requesting that a proxy device act as its proxy to monitor its signaling/control channel(s) while the client terminal 502 switches from an idle mode to a proxy mode. In the proxy mode, the client terminal 502 may conserve power by powering down its first communication interface 506. Powering down the first communication interface 506 may include turning off the first communication interface 506 until a message is received via the second communication interface 510, or cycling the first communication interface 506 between on and off at a cycle rate that is relatively longer than a short cycle rate indicated to the access node.

To reduce latency when the client terminal 502 has its first communication interface 510 powered down, the client terminal 502 may send a message to the access node (or first wireless network) indicating that the client terminal 502 will be monitoring its signaling/control channel(s) at a short cycle rate. By way of example and not limitation, in at least some implementations the client terminal 502 may be adapted for operating a PTT application. In order to reduce the conventional delay experienced by a user from the time a client terminal sends a PTT call request to the client terminal 502 until the time the user is able to start sending voice data, the client terminal 502 may send a message to the access node that the client terminal 502 will be monitoring the relevant signaling/control channel at a short cycle rate of less than about 5.12 seconds. In some instances, the client terminal 502 for PTT applications may indicate a short cycle rate of, for example, 1 second, 800 milliseconds, 500 milliseconds, 300 milliseconds, 200 milliseconds, or 100 milliseconds or less.

Having assigned a proxy and indicated to the access node (or first wireless network) a short cycle rate for monitoring it's signaling/control channel(s), the client terminal 502 may then monitor its second communication interface 510 for any messages forwarded by the proxy device. In at least some implementations, the client terminal 502 may be adapted to monitor its second communication interface 510 at a short cycle rate. By way of example and not limitation, the client terminal may monitor its second communication interface 510 at a cycle rate between about 50 and 100 milliseconds.

According to some optional features, the client terminal may be further adapted to send a call initiation message to the proxy device via its second communication interface 510. In conventional client terminals, when a user chooses to make a call (e.g., a PTT call) to another terminal, the client terminal may power up and connect to the access node over its first communication interface prior to sending a call initiation message to the access node (or first wireless network). Such power up and connection process may require significant time before the call initiation message is sent to the access node. Thus, according to one feature, the client terminal 502 may be adapted to send the call initiation message via its second communication interface 510 to the proxy device before or while the client terminal powers up the first communication interface 506 (e.g., switches from proxy mode to active mode). The client terminal may accordingly eliminate up to 200 milliseconds of latency.

Figure 6:
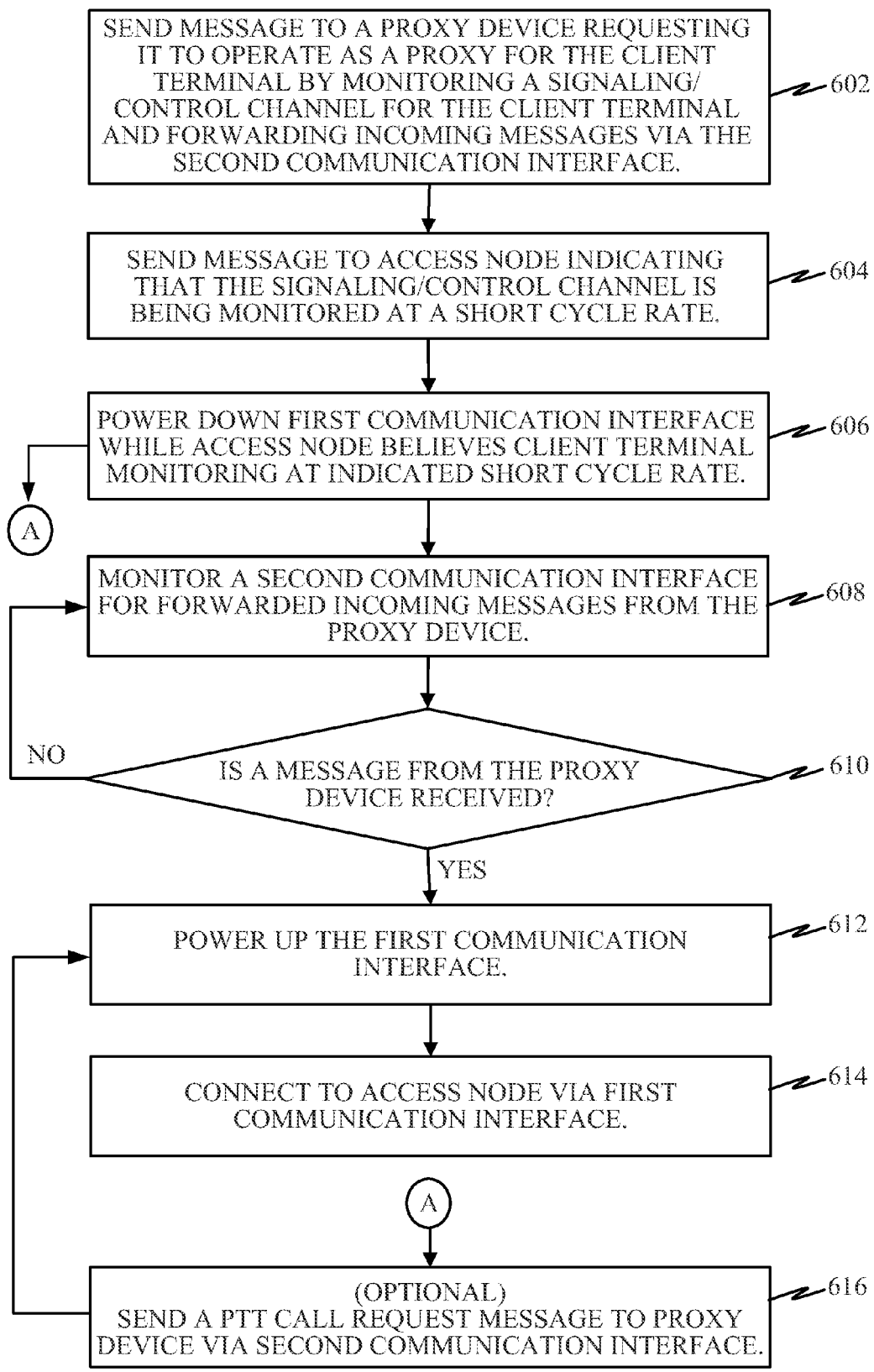
FIG. 6 is a flow diagram illustrating a method operational in a client terminal for both power conservation and reduced latency by using a proxy device.

FIG. 6 is a flow diagram illustrating a method operational in a client terminal for both power conservation and reduced latency by using a proxy device. Initially, a message may be sent to a proxy device indicating that the proxy device should act as a proxy for the client terminal 602. The message may include a client identifier, one or more signaling/control channels, and a short cycle rate for monitoring the one or more signaling/control channels associated with the client terminal. The client terminal may also send a message to an access node indicating that the one or more signaling/control channels are being monitored by the client terminal at the short cycle rate 604. In at least some implementations, the message to the access node may indicate a cycle rate selected from a range of cycle rates from less than about 5.12 seconds or less than about 1.28 seconds. In some instances, the message to the access node may indicate a cycle rate of, for example, about 1 second, 800 milliseconds, 500 milliseconds, 300 milliseconds, 200 milliseconds, or 100 milliseconds or less. That is, the client terminal may indicate to the access node that it is monitoring the one or more signaling/control channels every 1 second, 800 milliseconds, 500 milliseconds, 300 milliseconds, 200 milliseconds, 100 milliseconds, continuously, or somewhere in between.

The client terminal may then power down its first communication interface for an interval that is longer than the short cycle rate indicated to the access node 606. In some implementations, the first communication interface may be powered off continuously until a page message or wake-up message is received over a second communication interface from the proxy device. In other implementations, the client terminal may cycle the first communication interface may be cycled between on and off at a cycle rate that is longer than the short cycle rate. By way of example and not limitation, the client terminal may turn off its first communication interface for an interval comprising about 5.12 seconds or longer.

With the first communication interface powered down, the client terminal may monitor its second communication interface for incoming messages from the proxy device 608. In at least some implementations, the client terminal may monitor its second communication interface on a cycle where the second communication interface switches between on and off. By way of example and not limitation, the second communication interface may be monitored at a cycle rate between about 50 and 100 milliseconds. If a message is received via the second communication interface from the proxy device 610, the client terminal may power up its first communication interface 612 and connect to the access node via the first communication interface 614.

According to at least one optional feature, the client terminal may be adapted to send a call request message to the proxy device via the second communication interface when the first communication interface is powered down 616. The call request message may be sent to the proxy device before the client terminal powers up 612 its first communication interface or at the same time as the client terminal is powering up its first communication interface. The proxy device receiving the call request message via the second communication interface may then forward the call request message to the access node.

Exemplary Proxy Device

Figure 7:
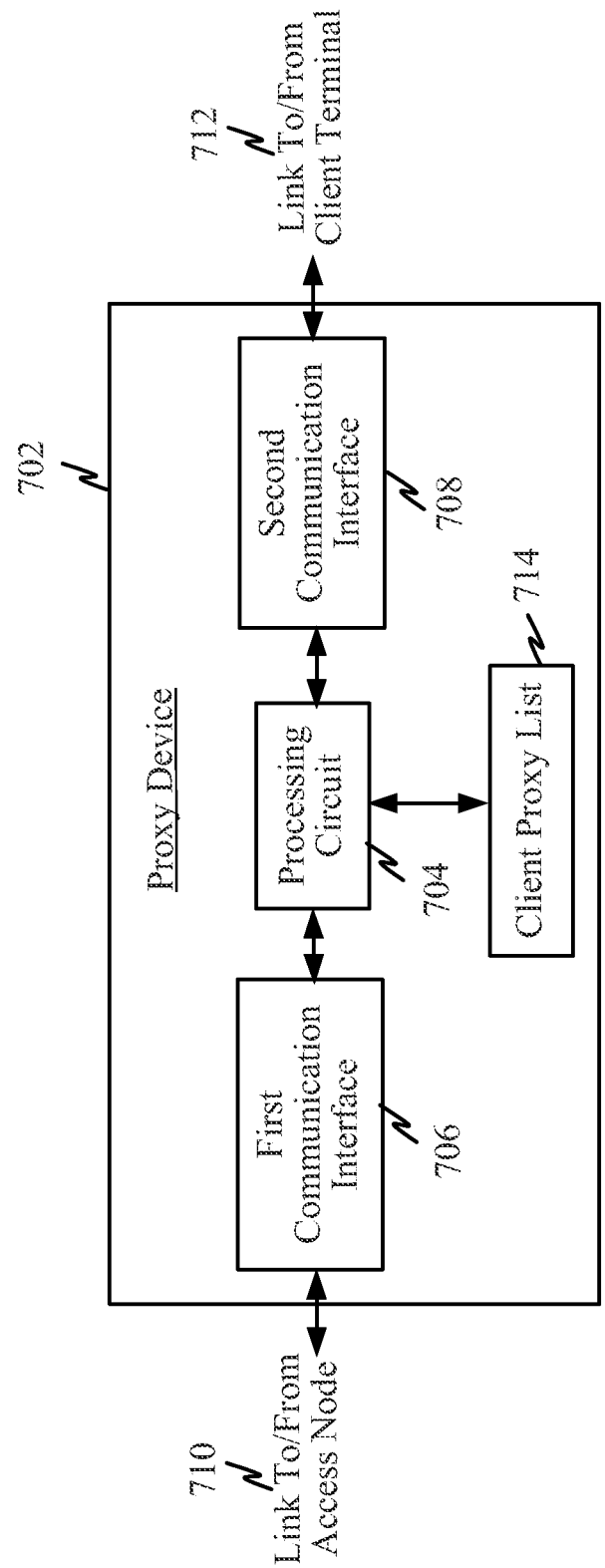
FIG. 7 is a block diagram of an example of a proxy device configured to act as a proxy for client terminals to facilitate both power conservation and reduced latency in the client terminals.

FIG. 7 is a block diagram of an example of a proxy device configured to act as a proxy for client terminals to facilitate both power conservation and reduced latency in the client terminals. The proxy device 702 may include a processing circuit 704, a first (e.g., primary) communication interface 706, and a second (e.g., secondary) communication interface 708. The first communication interface 706 communicatively couples the proxy device 702 to an access node via a first wireless communication link 710. For example, the first communication interface 706 may be a high power interface used for long range communications, such as over a CDMA-compliant network. The second communication interface 708 may be used to couple the proxy device 702 to a client terminal 712. For example, the second communication interface 708 may be a lower power interface used for short range communications, such as over a Bluetooth-compliant network.

In one mode of operation, the proxy device 702 may be configured to monitor signaling/control channels for client terminals identified on a client proxy list 714 via its first communication interface 706. That is, the proxy device 702 may have agreed to act as a proxy for one or more client terminals. In such proxy mode, the proxy device 702 may use its first communication interface 706 to monitor the signaling/control channel(s) associated with the client terminals for which it agreed to act as a proxy. The proxy device 702 monitors the signaling/control channel(s) at the short cycle rate indicated by the client terminal to the access node. The proxy device 702 may receive a message from the client terminal indicating the short cycle rate, or the proxy device 702 may utilize a message broadcast from the client terminal for the access node indicating the short cycle rate.

If a message is received via a signaling/control channel, the proxy device 702 may forward the message through its second communication interface 708 via a link to the corresponding client terminal 712. In forwarding the message, the proxy device 702 may translate it from a first protocol (associated with the first communication interface 706) to a second protocol (associated with the second communication interface 708).

According to some optional features, the proxy device 702 may further be adapted to send one or more messages on behalf of a client terminal. For instance, if a message is received for the client terminal via a signaling/control channel, the proxy device 702 may forward the message as discussed above, and may additionally send an acknowledgement (e.g., PTT Accept Call message) to the access node in response to the received message and on behalf of the client terminal. By sending the acknowledgement on behalf of the client terminal, as much as about 100 milliseconds of latency may be avoided, which latency is associated with the time for the client terminal to go to full power (e.g., first communication interface wake up, RF warm up, connect to the access node).

The proxy device 702 may also be adapted to receive a call initiation message (e.g., a PTT call request message) from the client terminal via the second communication interface. The proxy device 702 may forward the call initiation message to the access node via its first communication interface 706. Accordingly, the latency associated with the time for the client terminal to go to full power (as much as about 200 milliseconds) is avoided by sending the call initiation message while the first communication interface of the client terminal is powering up.

Figure 8:
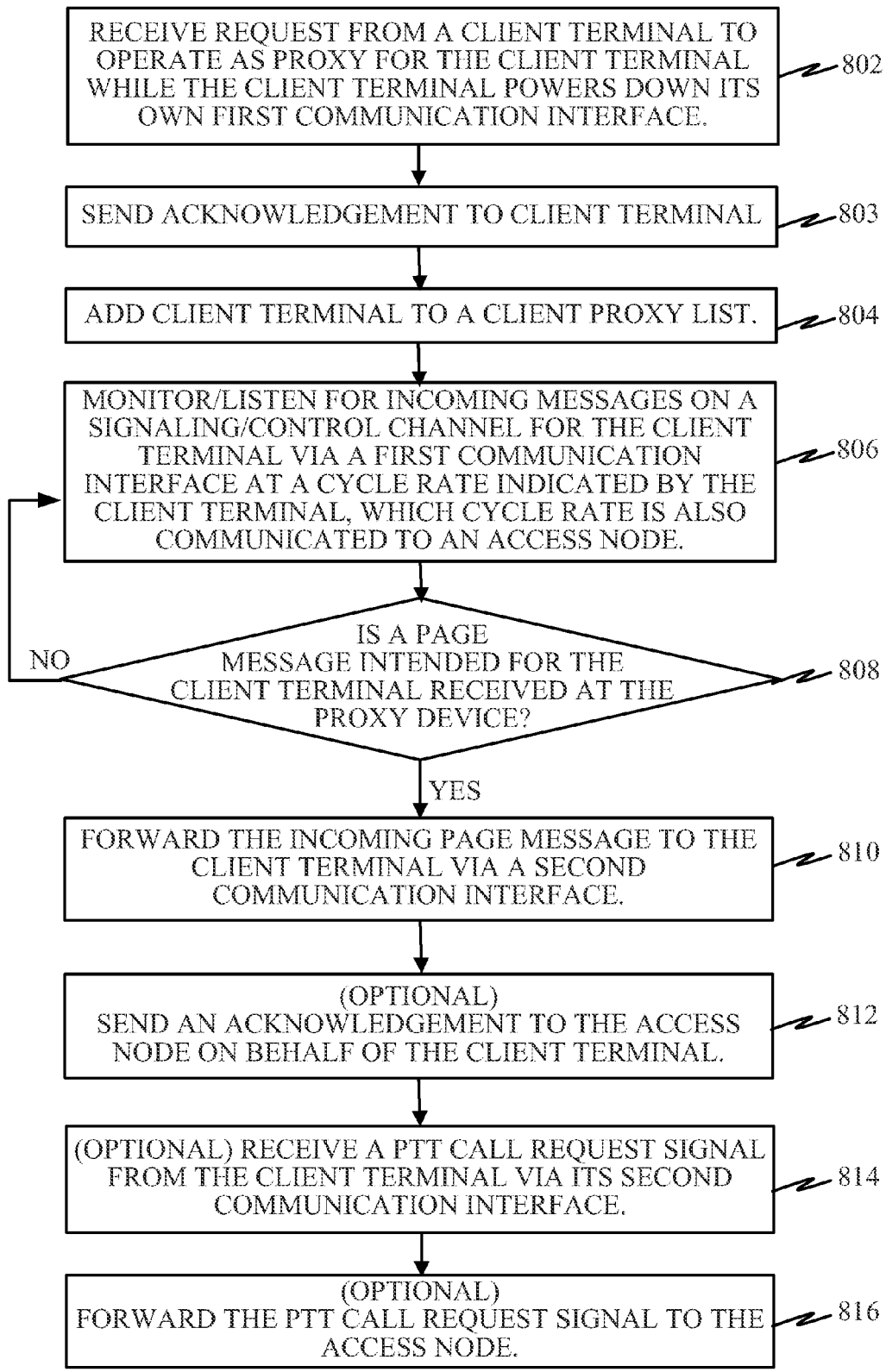
FIG. 8 is a flow diagram illustrating a method operational in a proxy device for facilitating power conservation in client terminals.

FIG. 8 is a flow diagram illustrating a method operational in a proxy device for facilitating power conservation in client terminals. A request, including a client terminal identifier and signaling/control channel associated with the client terminal, may be received from a client terminal requesting the proxy device to operate as a proxy for the client terminal 802. Such request may be received on either a first (e.g., primary) communication interface or a second (e.g., secondary) communication interface of the proxy device. A confirmation of the request may be sent to the client terminal 803, at which time the client terminal may power down its first communication interface. The client identifier and signaling/control channel(s) associated with the client terminal may then be added to a client proxy list on the proxy device 804. Effectively, the proxy device may then receive messages from an access node that is intended for the client terminal.

The proxy device may then listen or monitor for messages on the signaling/control channel(s) for the client terminal through a first communication interface 806. The proxy device may determine whether the received message is intended for a client terminal on the proxy list 808. If no messages for the client terminals in the proxy list are received, the proxy device may continue to listen for messages 806 on the signaling/control channel(s) for the client terminal via its first communication interface. If the proxy device receives a message that is meant for a client terminal on the proxy list, the proxy device forwards the message to the client terminal via its second communication interface 810.

According to some optional features, the proxy device may send an acknowledgment message to the access node on behalf of the client terminal 812. For example, if the received message includes a page message such as a PTT Announce Call message, the proxy device may send an accept-call message to the access node on behalf of the client terminal, to effectively remove the latency associated with the time required for the client terminal to send the accept-call message itself. Furthermore, the proxy device may receive a call initiation message (e.g., a PTT Announce Call message) from the client terminal via the second communication interface 814. The proxy device 602 may forward the call initiation message to the access node via its first communication interface 816.

One or more of the components, steps, features and/or functions illustrated in FIGS. 1, 2, 3, 4, 5, 6, 7, 8, 9, 10 and/or 11 may be rearranged and/or combined into a single component, step, feature or function or embodied in several components, steps, or functions. Additional elements, components, steps, and/or functions may also be added without departing from the invention. The apparatus, devices, and/or components illustrated in FIGS. 1, 5, and/or 7 may be configured to perform one or more of the methods, features, or steps described in FIGS. 2, 3, 4, 6, 8, 9, 10 and/or 11. The novel algorithms described herein may also be efficiently implemented in software and/or embedded in hardware.

Also, it is noted that at least some implementations have been described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, embodiments may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Moreover, a storage medium may represent one or more devices for storing data, including read-only memory (ROM), random access memory (RAM), magnetic disk storage mediums, optical storage mediums, flash memory devices and/or other machine-readable mediums, processor-readable mediums, and/or computer-readable mediums for storing information. The terms "machine-readable medium" includes", "computer-readable medium", and/or "processor-readable medium" may include, but are not limited to non-transitory mediums such as portable or fixed storage devices, optical storage devices, wireless channels and various other mediums capable of storing, containing or carrying instruction(s) and/or data. Thus, the various methods described herein may be fully or partially implemented by instructions and/or data that may be stored in a "machine-readable medium", "computer-readable medium", and/or "processor-readable medium" and executed by one or more processors, machines and/or devices.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. A client terminal, comprising:
   a first communication interface for wirelessly communicating with an access node;
   a second communication interface for wirelessly communicating with a proxy device, the second communication interface configured to operate at a lower power than that of the first communication interface; and
   a processing circuit coupled to the first communication interface and the second communication interface, the processing circuit adapted to:
      send a message intended for a proxy device, the message including a request to operate as a proxy by monitoring a signaling/control channel for the client terminal and forwarding incoming messages from the signaling/control channel to the client terminal via the second communication interface;
      send a message intended for an access node indicating monitoring of the signaling/control channel at a short cycle rate using the first communication interface;
      power down the first communication interface while the access node is configured to transmit messages to the client terminal at the indicated short cycle rate; and
      monitor the second communication interface for forwarded incoming messages.

2. The client terminal of claim 1, wherein at least one of the first communication interface is a Code Division Multiple Access (CDMA)-compliant interface or the second communication interface is a Bluetooth-compliant interface.

3. The client terminal of claim 1, wherein the message to the access node indicates monitoring of the signaling/control channel continuously.

4. The client terminal of claim 1, wherein powering down the first communication interface reduces the power consumption of the first communication interface but does not turn it fully off 5. The client terminal of claim 1, wherein powering down the first communication interface reduces the power consumption of the first communication interface by monitoring the signal/control channel at a long cycle rate, where the long cycle rate is longer than the short cycle rate.

6. The client terminal of claim 1, wherein the processing circuit is further adapted to:
   power down the first communication interface by turning off the first communication interface until a forwarded incoming message is received via the second communication interface.

7. The client terminal of claim 1, wherein the processing circuit is further adapted to:
   receive a forwarded incoming message comprising a push-to-talk Announce Call message.

8. The client terminal of claim 1, wherein the processing circuit is further adapted to
   send a push-to-talk call request message to the proxy device via the second communication interface when the first communication interface is powered down.

9. The client terminal of claim 1, wherein the processing circuit is adapted to monitor the second communication interface at a cycle rate between about 50 milliseconds and 100 milliseconds.

10. A method operational on a client terminal, comprising:
sending a message including a request for a proxy device to operate as a proxy by monitoring a signaling/control channel for the client terminal and forwarding incoming messages from the signaling/control channel to the client terminal via a second communication interface;
sending a message including an indication for an access node that the signaling/control channel is being monitored at a short cycle rate by a first communication interface, wherein the second communication interface is configured to operate at a lower power than that of the first communication interface;
powering down the first communication interface while an access node is configured to transmit messages to the client terminal at the indicated short cycle rate; and
monitoring the second communication interface for forwarded incoming messages from the proxy device.

11. The method of claim 10, wherein sending the message to a proxy device requesting it to operate as a proxy includes sending a message including a client identifier, at least one signaling/control channel and a cycle rate for monitoring the at least one signaling/control channel.

12. The method of claim 10, wherein the message with the indication to the access node indicates continuous monitoring of the signaling/control channel by the client terminal.

13. The method of claim 10, wherein powering down the first communication interface reduces the power consumption of the first communication interface but does not turn it fully off 14. The method of claim 10, wherein powering down the first communication interface includes turning off the first communication interface for an interval longer than the short cycle rate.

15. The method of claim 10, wherein monitoring the second communication interface includes cycling the second communication interface between on and off at a cycle rate of 200 milliseconds or less.

16. The method of claim 10, further comprising:
receiving a forwarded incoming message from the proxy device via the second communication interface, wherein the forwarded incoming message from the proxy device comprises a push-to-talk Announce Call message.

17. The method of claim 10, further comprising sending a push-to-talk call request message to the proxy device via the second communication interface after powering down the first communication interface.

18. A client terminal, comprising:
means for sending a message to a proxy device requesting it to operate as a proxy by monitoring a signaling/control channel for the client terminal and forwarding incoming messages from the signaling/control channel to the client terminal via the second communication interface;
means for sending a message to an access node indicating that the signaling/control channel is being monitored at a short cycle rate by a first communication interface, wherein the second communication interface is configured to operate at a lower power than that of the first communication interface;
means for powering down the first communication interface while the access node is configured to transmit messages to the client terminal at the indicated short cycle rate; and
means for monitoring the second communication interface for forwarded incoming messages from the proxy device.

19. The client terminal of claim 18, further comprising:
means for sending a push-to-talk call request message to the proxy device via the second communication interface while the first communication interface is powered down.

20. The client terminal of claim 18, wherein powering down the first communication interface includes turning off the first communication interface for an interval longer than the short cycle rate.

21. A non-transitory processor-readable medium having one or more instructions operational on a client terminal for conserving power at the client terminal and reducing latency, which when executed by a processor causes the processor to:
send a message to a proxy device requesting it to operate as a proxy by monitoring a signaling/control channel for the client terminal and forwarding incoming messages from the signaling/control channel to the client terminal via a second communication interface;
send a message to an access node indicating that the signaling/control channel is being monitored at a short cycle rate by a first communication interface, wherein the second communication interface is configured to operate at a lower power than that of the first communication interface;
power down a first communication interface while the access node is configured to transmit messages to the client terminal at the indicated short cycle rate; and
monitor the second communication interface for forwarded incoming messages from the proxy device.

22. The non-transitory processor-readable medium of claim 21, further comprising one or more instructions operational on the client terminal, which when executed by a processor causes the processor to:
send a push-to-talk call request message to the proxy device via the second communication interface while the first communication interface is powered down.

23. A proxy device, comprising:
a first communication interface for communicating with an access node;
a second communication interface for wirelessly communicating with a client terminal, the second communication interface configured to operate at a lower power than that of the first communication interface; and
a processing circuit coupled between the first communication interface and the second communication interface, the processing circuit adapted to:
receive a request from the client terminal to operate as a proxy for the client terminal while the client terminal powers down its own first communication interface;
send an acknowledgement to the client terminal that it will operate as a proxy for the client terminal;
monitor for incoming messages on a signaling/control channel for the client terminal via the first communication interface at a cycle rate indicated by the client terminal, wherein the same cycle rate is also communicated to an access node to indicate that the signaling/control channel is being monitored by a first communication interface of the client terminal at the cycle rate, even though the first communication interface of the client terminal is powered down; and
forward an incoming message received via the first communication interface to the client terminal via the second communication interface.

24. The proxy device of claim 23, wherein at least one of the first communication interface is a Code Division Multiple Access (CDMA)-compliant interface or the second communication interface is any Bluetooth compliant interface.

25. The proxy device of claim 23, wherein the cycle rate indicated by the client terminal and also communicated to the access node is less than 5.12 seconds.

26. The proxy device of claim 23, wherein the cycle rate indicated by the client terminal and also communicated to the access node is less than 300 milliseconds.

27. The proxy device of claim 23, wherein the cycle rate indicated by the client terminal and also communicated to the access node is continuous.

28. The proxy device of claim 23, wherein the processing circuit is further adapted to:
send a message to an access node on behalf of the client terminal in response to an incoming message received from the access node that is intended for the client terminal.

29. The proxy device of claim 23, wherein the request from the client terminal includes a client identifier, one or more signaling/control channels associated with the client terminal, and the cycle rate associated with the one or more signaling/control channels.

30. The proxy device of claim 23, wherein the processing circuit is further adapted to:
monitor for an incoming message comprising a push-to-talk Announce Call message on a signaling/control channel for the client terminal via the first communication interface at the cycle rate indicated by the client terminal and communicated to the access node; and
forward the push-to-talk Announce Call message received via the first communication interface to the client terminal via the second communication interface.

31. The proxy device of claim 23, wherein the processing circuit is further adapted to:
receive a push-to-talk call request message from the client terminal via the second communication interface; and
forward the push-to-talk call request message to an access node via the first communication interface.

32. A method operational on a proxy device, comprising:
receiving a request from a client terminal to operate as a proxy for the client terminal while the client terminal powers down its own first communication interface;
monitoring for incoming messages on a signaling/control channel for the client terminal via a first communication interface of the proxy device at a cycle rate indicated by the client terminal, the same cycle rate also being communicated to an access node to indicate that the signaling/control channel is being monitored by a first communication interface of the client terminal at the cycle rate, even though the first communication interface of the client terminal is powered down; and
forwarding an incoming message received via the first communication interface to the client terminal via a second communication interface, wherein the second communication interface is configured to operate at a lower power than that of the first communication interface of the proxy device.

33. The method of claim 32, wherein receiving the request from the client terminal includes receiving a client identifier, one or more signaling/control channels associated with the client terminal, and the cycle rate associated with the one or more signaling/control channels.

34. The method of claim 32, wherein the cycle rate indicated by the client terminal is less than 5.12 seconds.

35. The method of claim 32, wherein the cycle rate indicated by the client terminal is less than 300 milliseconds.

36. The method of claim 32, wherein the cycle rate indicated by the client terminal is continuous.

37. The method of claim 32, wherein monitoring for incoming messages on the signaling/control channel includes monitoring for a push-to-talk Announce Call message on the signaling/control channel, the method further comprising:
forwarding an incoming message received via the first communication interface to the client terminal via the second communication interface comprises forwarding the push-to-talk Announce Call message received via the first communication interface to the client terminal via the second communication interface.

38. The method of claim 32, further comprising:
receiving a push-to-talk call request message from the client terminal via the second communication interface; and
forwarding the push-to-talk call request message to the access node via the first communication interface.

39. The method of claim 32, further comprising sending an acknowledgement message to an access node on behalf of the client terminal in response to an incoming message received from the access node that is intended for the client terminal.

40. A proxy device, comprising:
second communication means for receiving a request from the client terminal to operate as a proxy for the client terminal while the client terminal powers down its own first communication interface;
first communication means for monitoring for incoming messages on a signaling/control channel for the client terminal at a cycle rate indicated by the client terminal, wherein the same cycle rate is also communicated to an access node to indicate that the signaling/control channel is being monitored by a first communication interface of the client terminal at the cycle rate, even though the first communication interface of the client terminal is powered down; and
means for forwarding an incoming message received from the access node via the first communication interface to the client terminal via the second communication means,
wherein the second communication means is configured to operate at a lower power than that of the first communication means.

41. The proxy device of claim 40,
wherein the second communication means is configured for receiving a push-to-talk call request message from the client terminal; and
wherein the first communication means is configured for forwarding the push-to-talk call request message to the access node.

42. The proxy device of claim 40, wherein the first communication means is configured for sending an acknowledgement message to the access node on behalf of the client terminal in response to an incoming message received from the access node that is intended for the client terminal.

43. A non-transitory processor-readable medium having one or more instructions operational on a proxy device for facilitating power conservation in client terminals and reducing system latency, which when executed by a processor causes the processor to:
receive a request from the client terminal to operate as a proxy for the client terminal while the client terminal powers down its own first communication interface;
monitor for incoming messages on a signaling/control channel for the client terminal via a first communication interface of the proxy device at a cycle rate indicated by the client terminal, wherein the same cycle rate is also communicated to an access node to indicate that the signaling/control channel is being monitored by a first communication interface of the client terminal at the cycle rate, even though the first communication interface of the client terminal is powered down; and forward an incoming message received via the first communication interface to the client terminal via a second communication interface, wherein the second communication interface is configured to operate at a lower power than that of the first communication interface of the proxy device.

44. The non-transitory processor-readable medium of claim 43, further comprising one or more instructions operational on the client terminal, which when executed by a processor causes the processor to:

receive a push-to-talk call request message from the client terminal via the second communication interface; and forward the push-to-talk call request message to the access node via the first communication interface

45. The non-transitory processor-readable medium of claim 43, further comprising one or more instructions operational on the client terminal, which when executed by a processor causes the processor to send an acknowledgement message to an access node on behalf of the client terminal in response to an incoming message received from the access node that is intended for the client terminal.

* * * * *